(12) United States Patent
Phillips

(10) Patent No.: US 10,059,276 B2
(45) Date of Patent: Aug. 28, 2018

(54) CARRIER FOR A TWO WHEELED VEHICLE

(71) Applicant: Cal M. Phillips, Platteville, WI (US)

(72) Inventor: Cal M. Phillips, Platteville, WI (US)

( * ) Notice: Subject to any disclaimer, the term of this patent is extended or adjusted under 35 U.S.C. 154(b) by 0 days.

(21) Appl. No.: 15/924,233

(22) Filed: Mar. 18, 2018

(65) Prior Publication Data

US 2018/0201202 A1    Jul. 19, 2018

Related U.S. Application Data

(63) Continuation-in-part of application No. 15/396,710, filed on Jan. 2, 2017, now Pat. No. 9,956,922.

(51) Int. Cl.
*B60R 9/10* (2006.01)
*B60R 9/04* (2006.01)
*B60R 9/06* (2006.01)

(52) U.S. Cl.
CPC ............. *B60R 9/10* (2013.01); *B60R 9/04* (2013.01); *B60R 9/06* (2013.01)

(58) Field of Classification Search
CPC ..... B60R 9/04; B60R 9/06; B60R 9/10; Y10S 224/924
See application file for complete search history.

(56) References Cited

U.S. PATENT DOCUMENTS

| | | | |
|---|---|---|---|
| 3,116,836 A | 1/1964 | McCauley | |
| 3,355,028 A | 11/1967 | Mork | |
| 3,529,737 A | 9/1970 | Daugherty | |
| 3,659,762 A | 5/1972 | Kravitz | |
| 3,843,001 A | 10/1974 | Willis | |
| 3,861,533 A | 1/1975 | Radek | |
| 4,400,129 A | 8/1983 | Eisenberg et al. | |
| 4,852,779 A | 8/1989 | Berg | |
| 4,875,608 A | 10/1989 | Graber | |
| 5,201,244 A | 4/1993 | Stewart et al. | |
| 5,303,857 A * | 4/1994 | Hewson | B60R 9/06 224/282 |
| 5,476,203 A * | 12/1995 | Fletcher | B60R 9/06 211/22 |
| 5,497,927 A * | 3/1996 | Peterson | B60R 9/06 224/519 |
| 5,653,512 A | 8/1997 | Phillips | |
| 5,692,659 A * | 12/1997 | Reeves | B60R 9/06 224/504 |

(Continued)

*Primary Examiner* — Corey Skurdal
(74) *Attorney, Agent, or Firm* — John V. Stewart

(57) ABSTRACT

A bike carrier mounted on a drawbar for a trailer hitch receiver via a pivot mechanism that allows the carrier to pivot between an operational horizontal position and a compact vertical position. A slidable trigger bar extends from the pivot mechanism to the back of the carrier. Pulling the trigger bar from the back of the carrier releases the pivot mechanism, providing a convenient operating position. One or more add-on bike carrying tray assemblies may be attached to a first bike carrying tray assembly on the drawbar to hold multiple bikes. Each add-on tray assembly may have a respective slidable trigger bar that latches onto the trigger bar of the previous tray assembly. A pull on the trigger bar of the last add-on assembly releases the pivot mechanism. This operates the pivot mechanism from the back of the carrier.

23 Claims, 21 Drawing Sheets

(56) References Cited

U.S. PATENT DOCUMENTS

| | | | | |
|---|---|---|---|---|
| 5,695,103 A | * | 12/1997 | Duvernay | B60R 9/06 224/502 |
| 5,833,074 A | | 11/1998 | Phillips | |
| 6,241,322 B1 | | 6/2001 | Phillips | |
| 6,244,483 B1 | * | 6/2001 | McLemore | B60R 9/06 224/521 |
| 6,406,051 B1 | | 6/2002 | Phillips | |
| 6,491,195 B1 | * | 12/2002 | McLemore | B60R 9/06 224/521 |
| 6,736,301 B1 | * | 5/2004 | Huang | B60R 9/06 224/500 |
| 7,806,308 B2 | * | 10/2010 | Gunn | B60R 9/06 224/512 |
| 7,854,359 B2 | * | 12/2010 | Gunn | B60R 9/10 224/504 |
| 7,900,801 B2 | * | 3/2011 | Huang | B60R 9/10 211/17 |
| 9,555,744 B1 | * | 1/2017 | Roth | B60R 9/10 |
| 2009/0140024 A1 | | 6/2009 | McLemore et al. | |

* cited by examiner

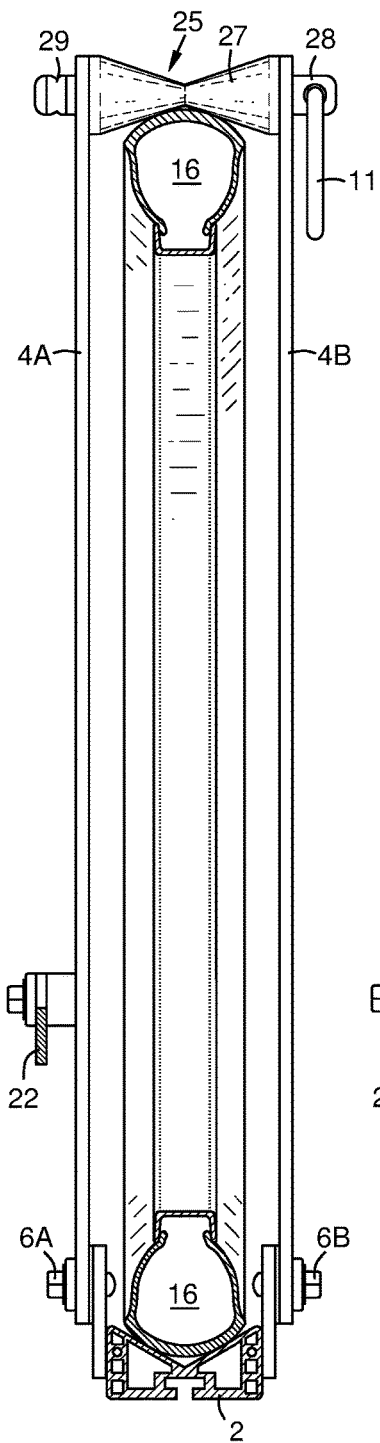
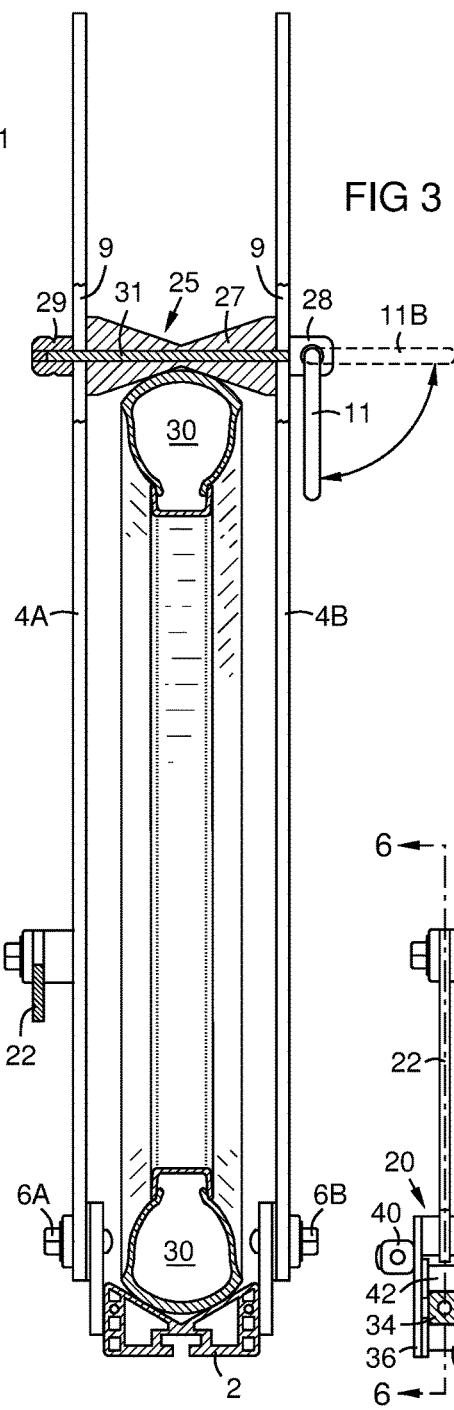
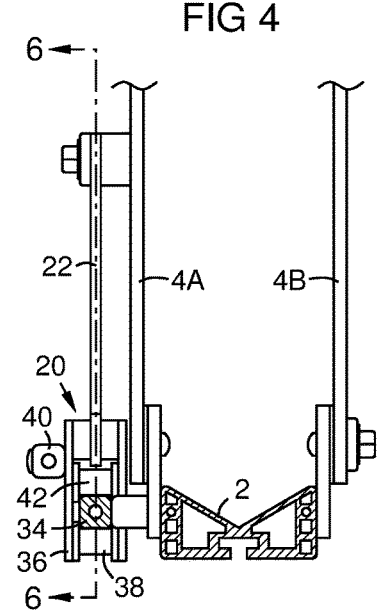

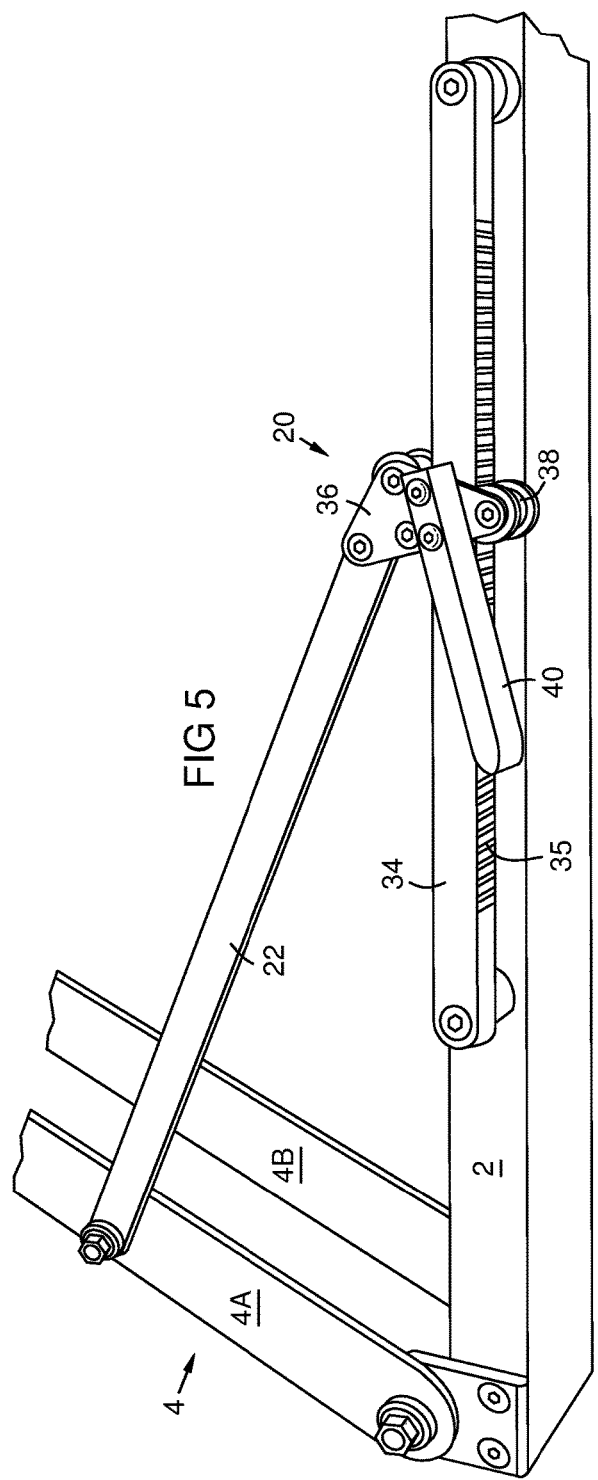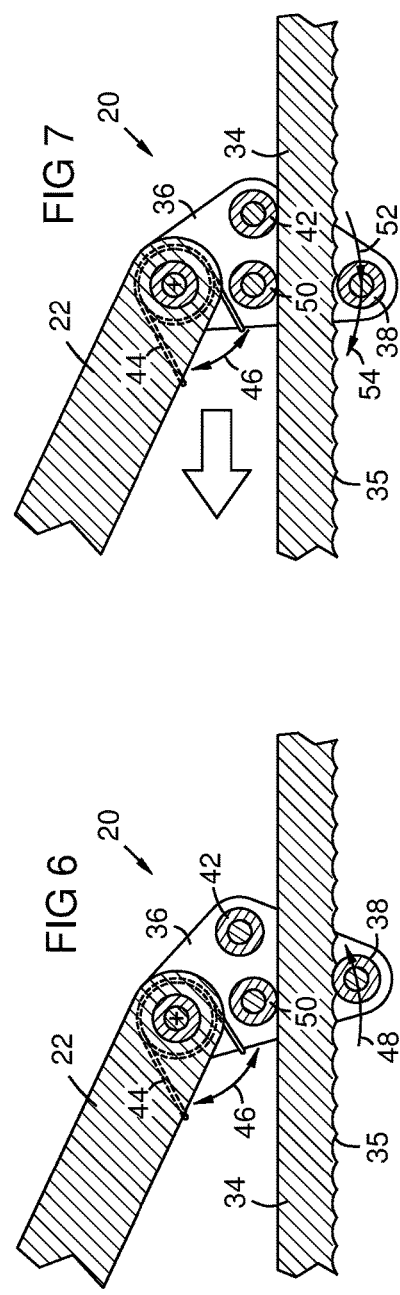

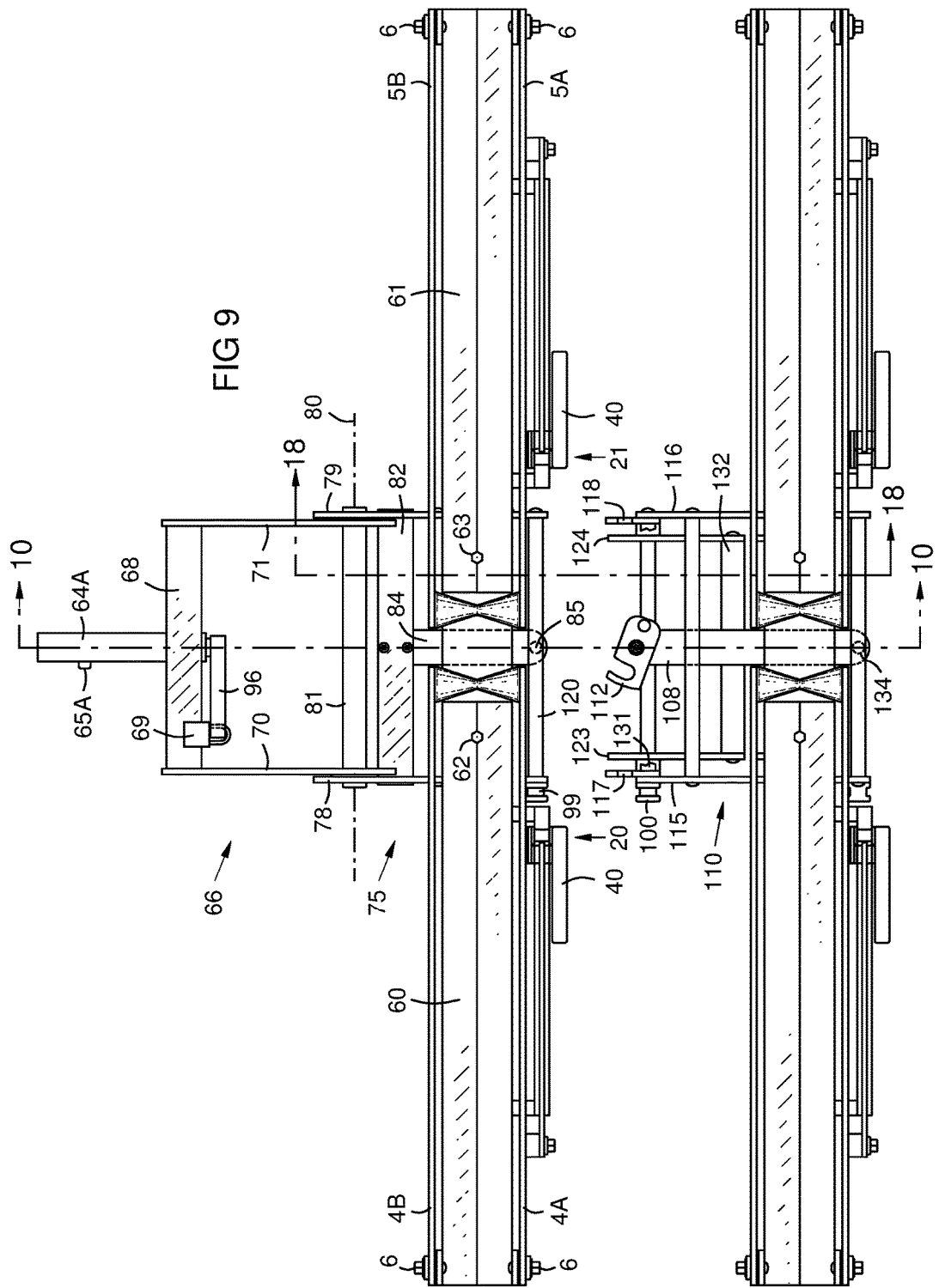

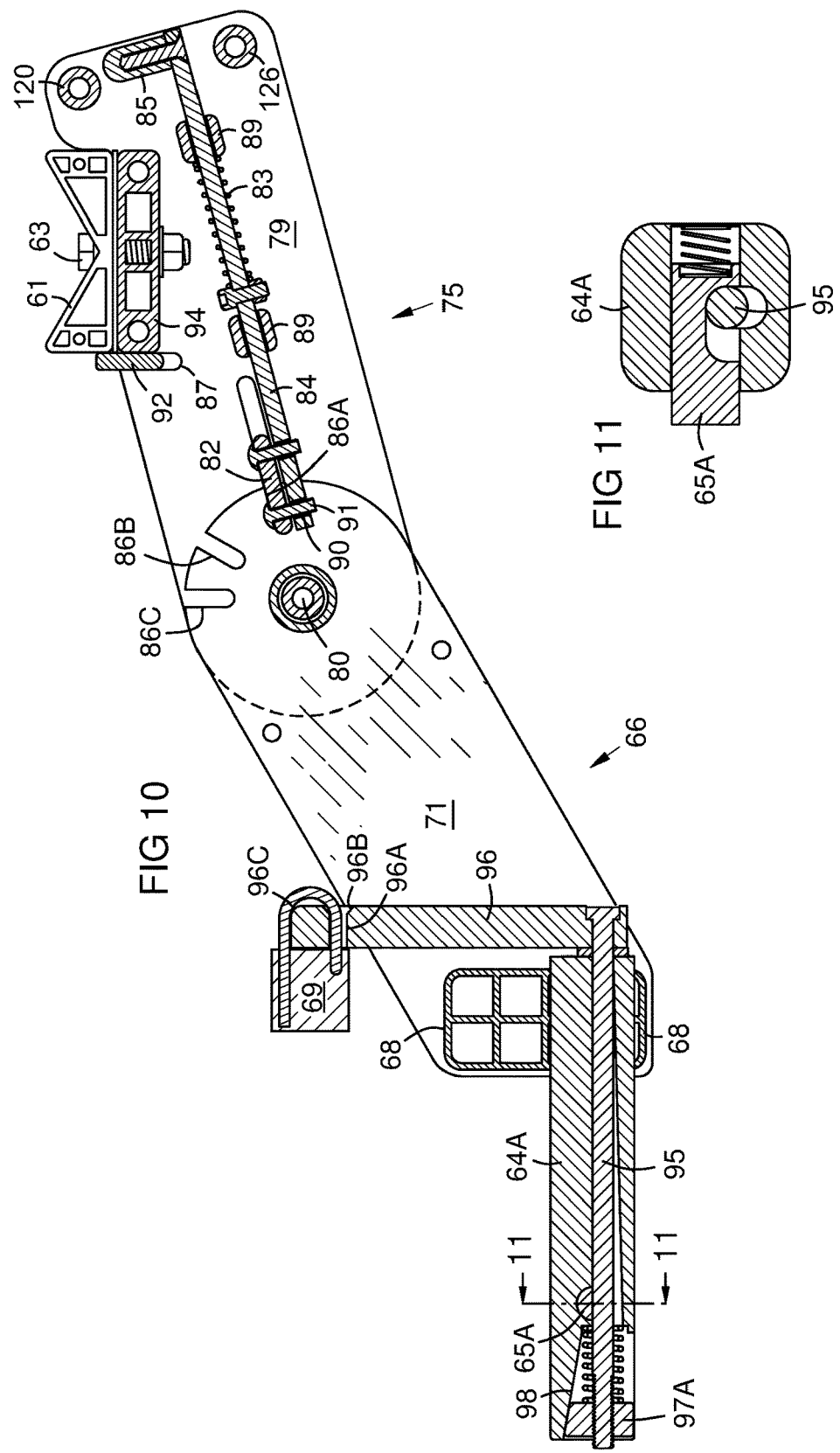

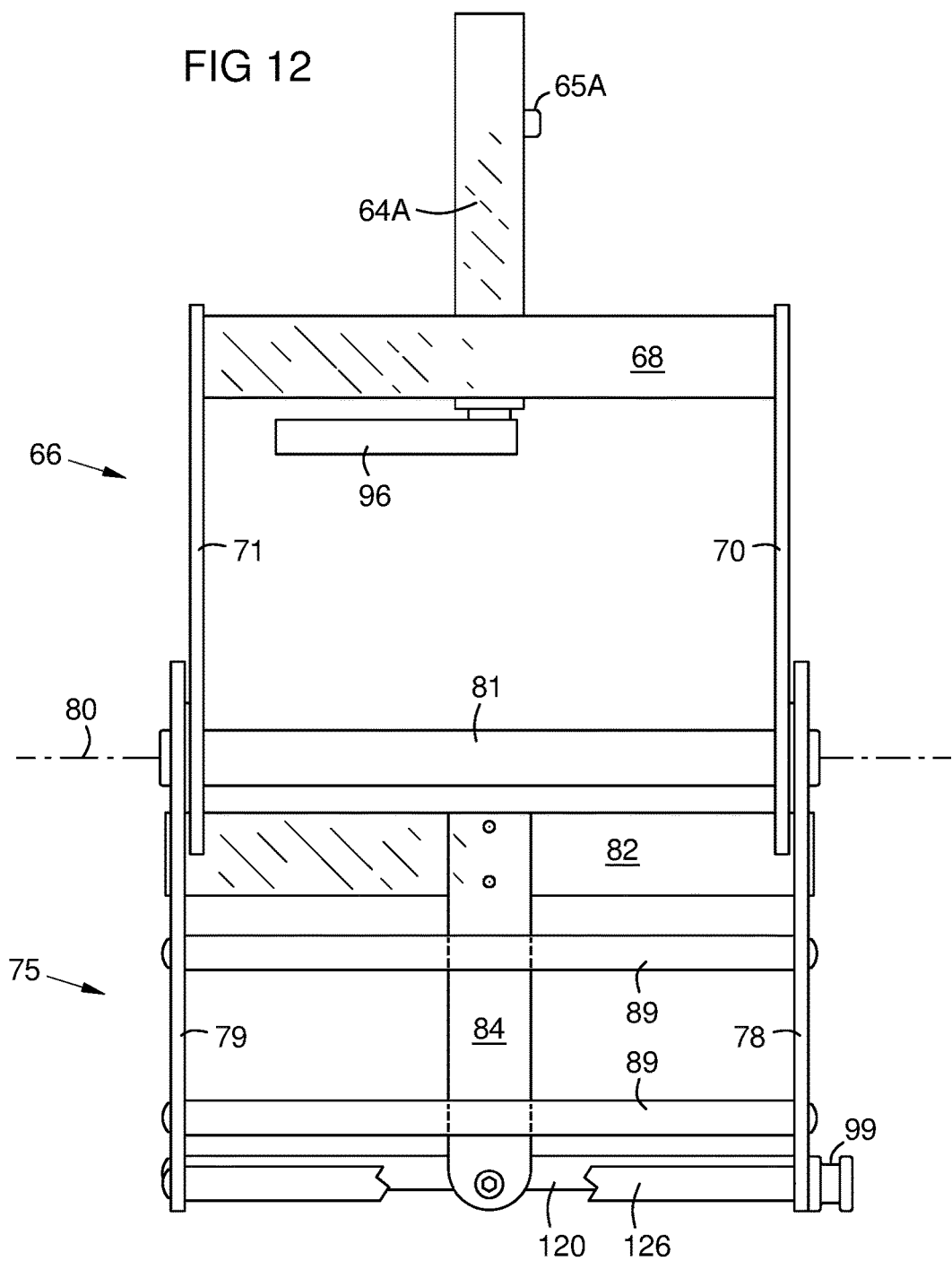

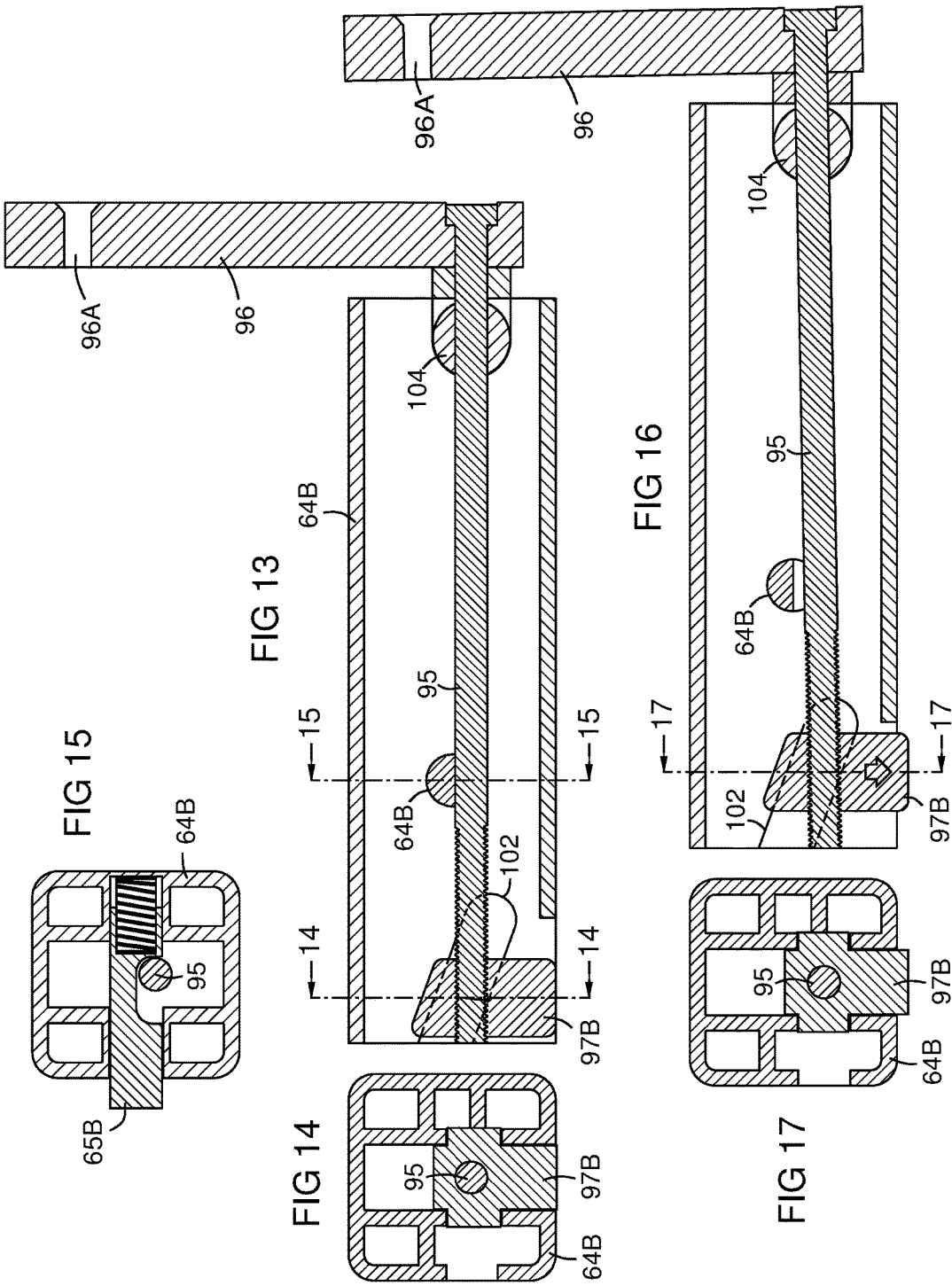

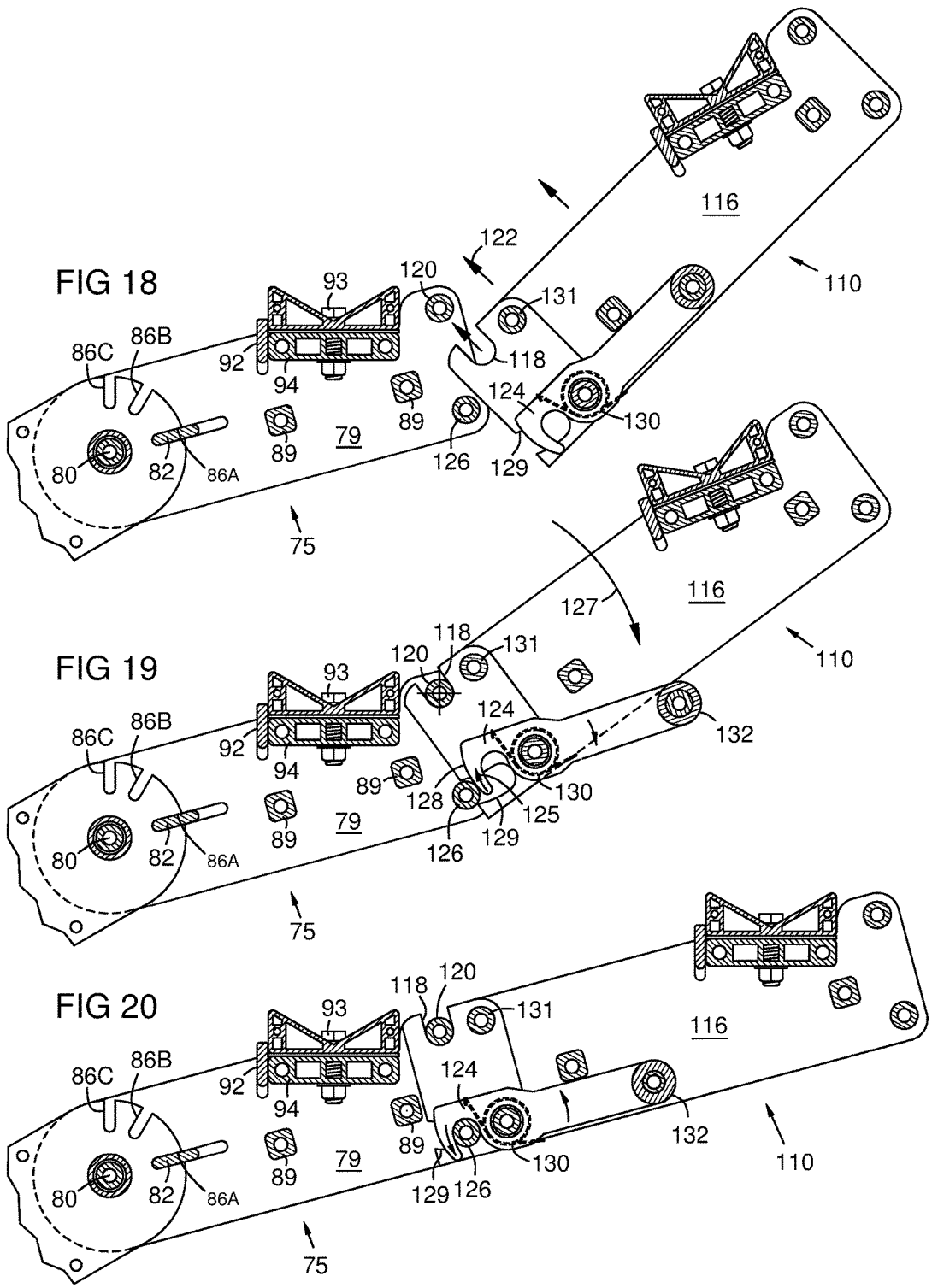

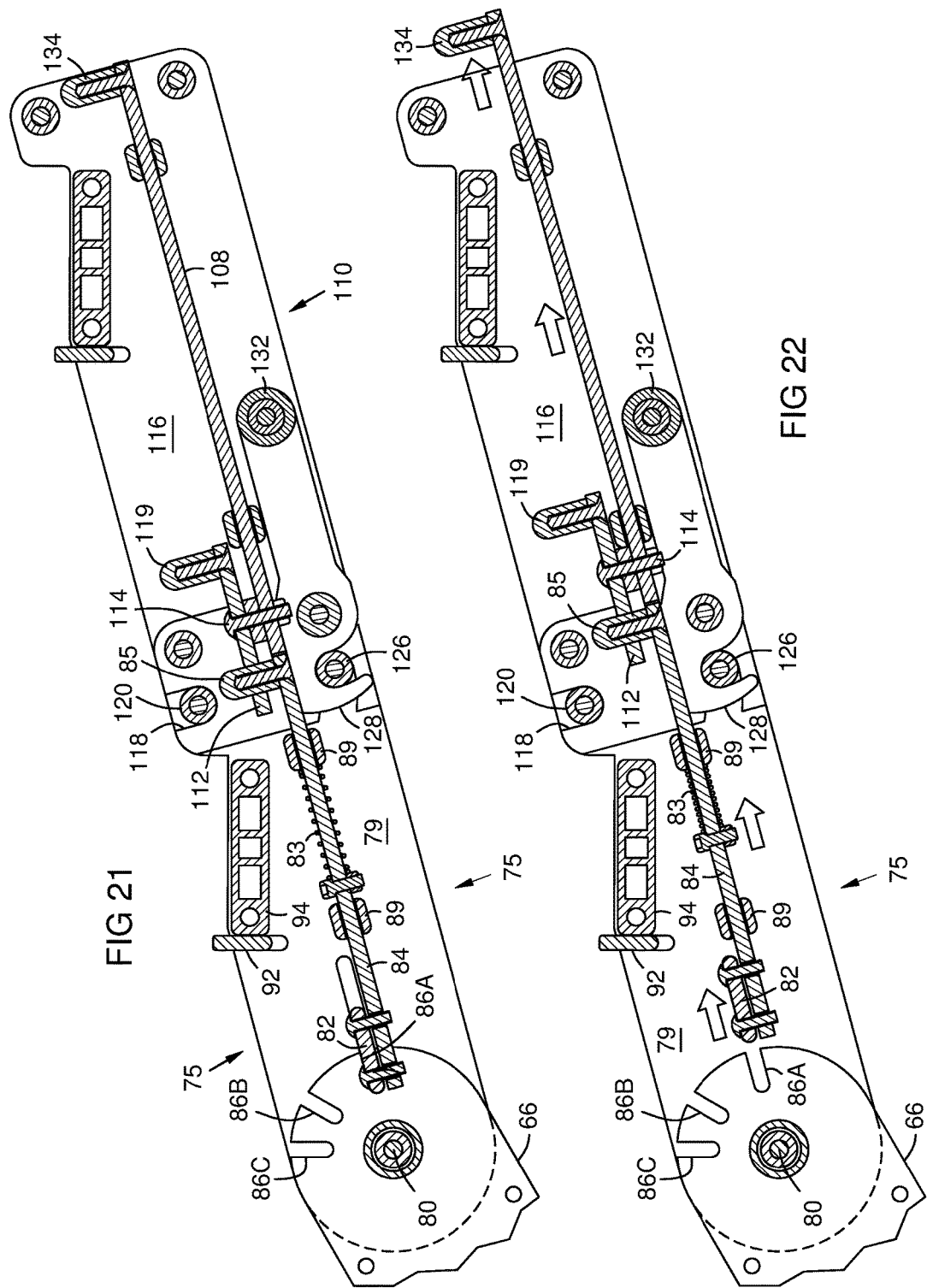

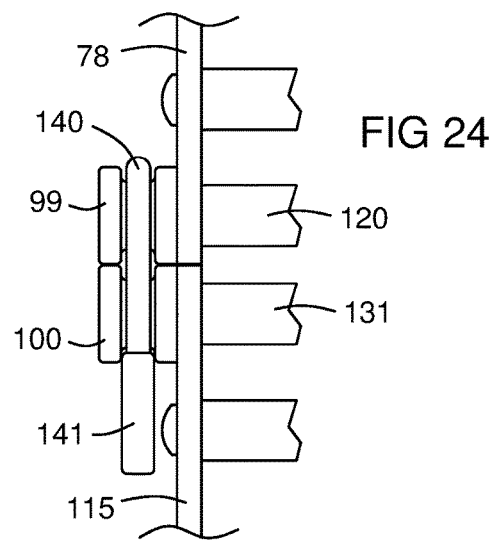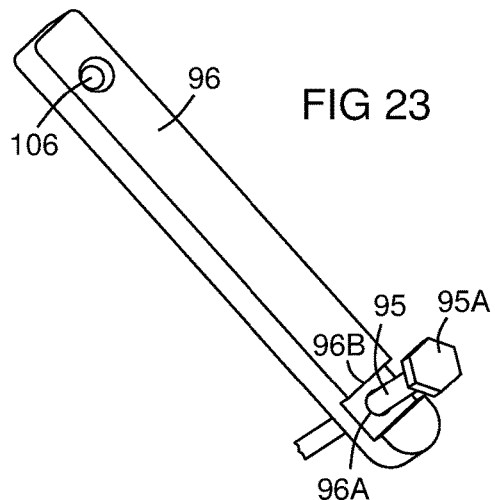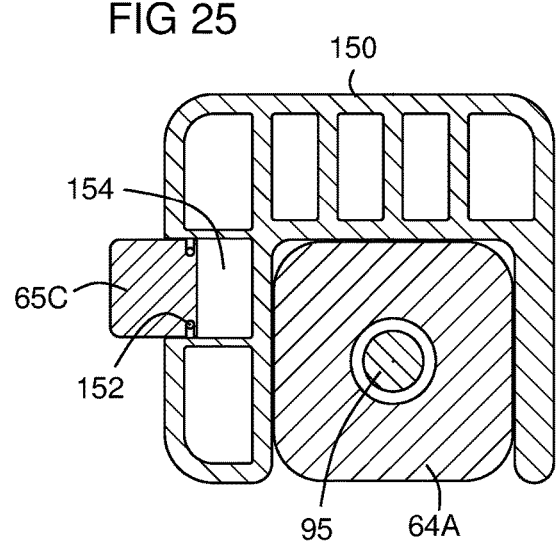

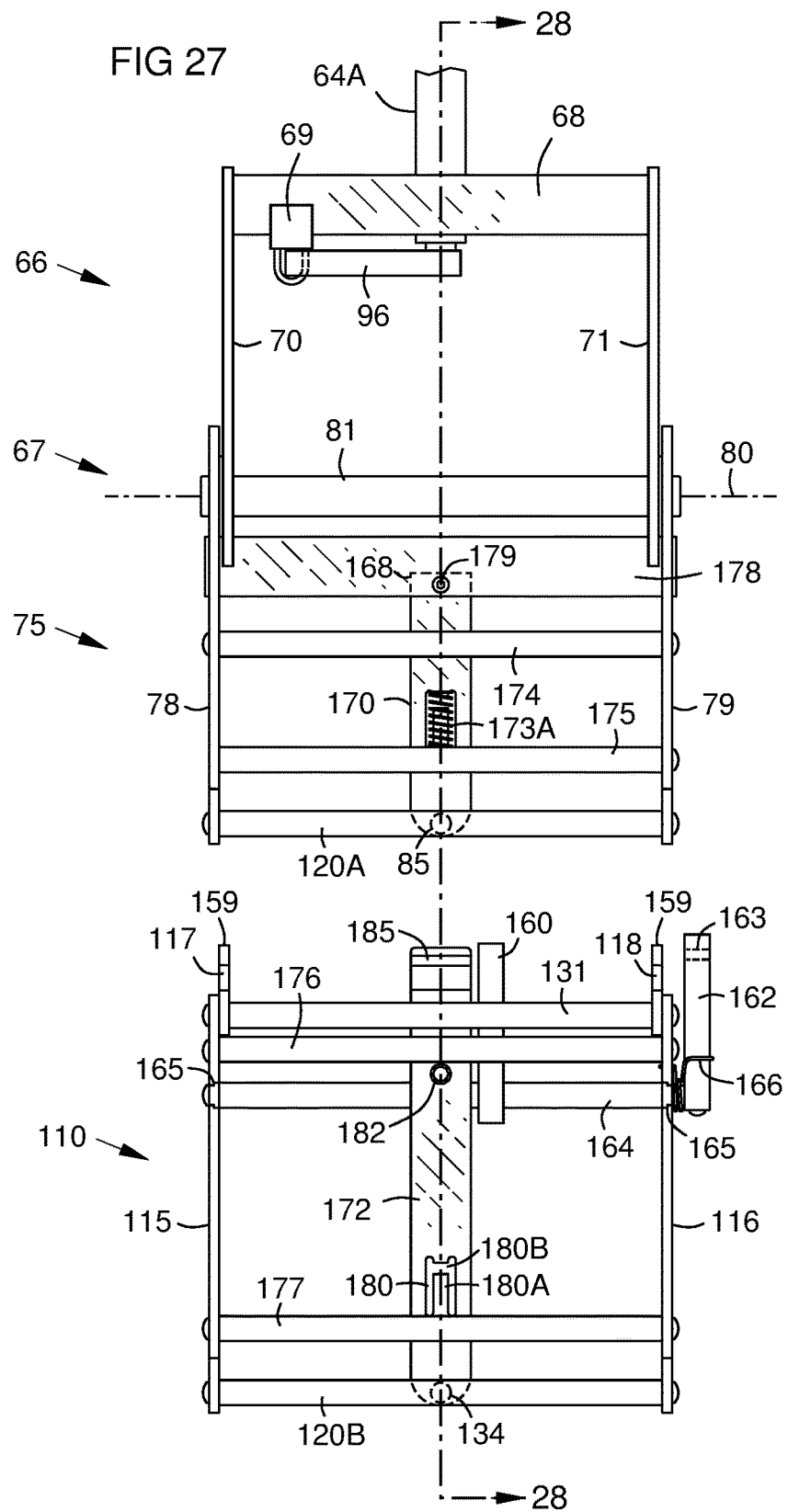

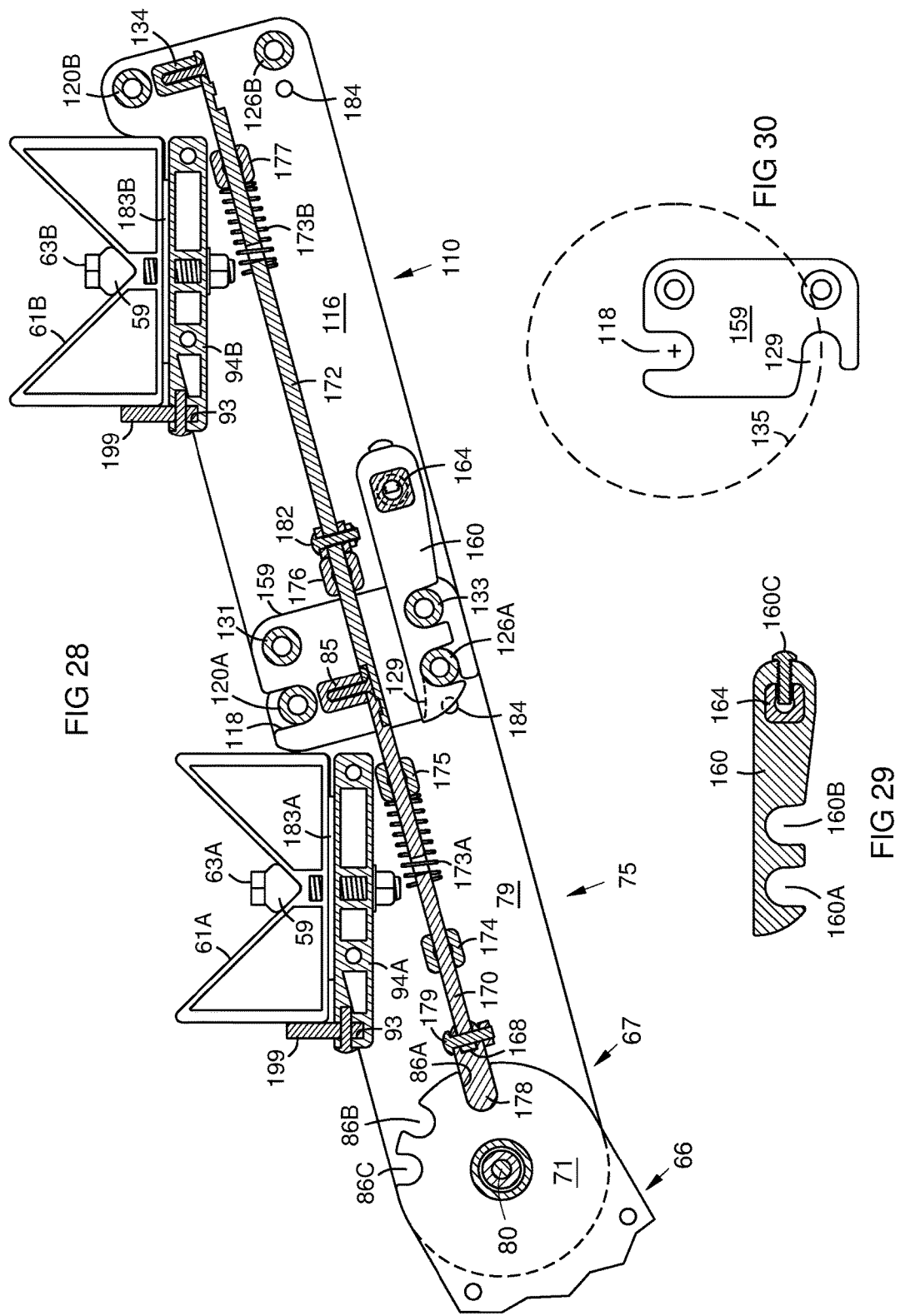

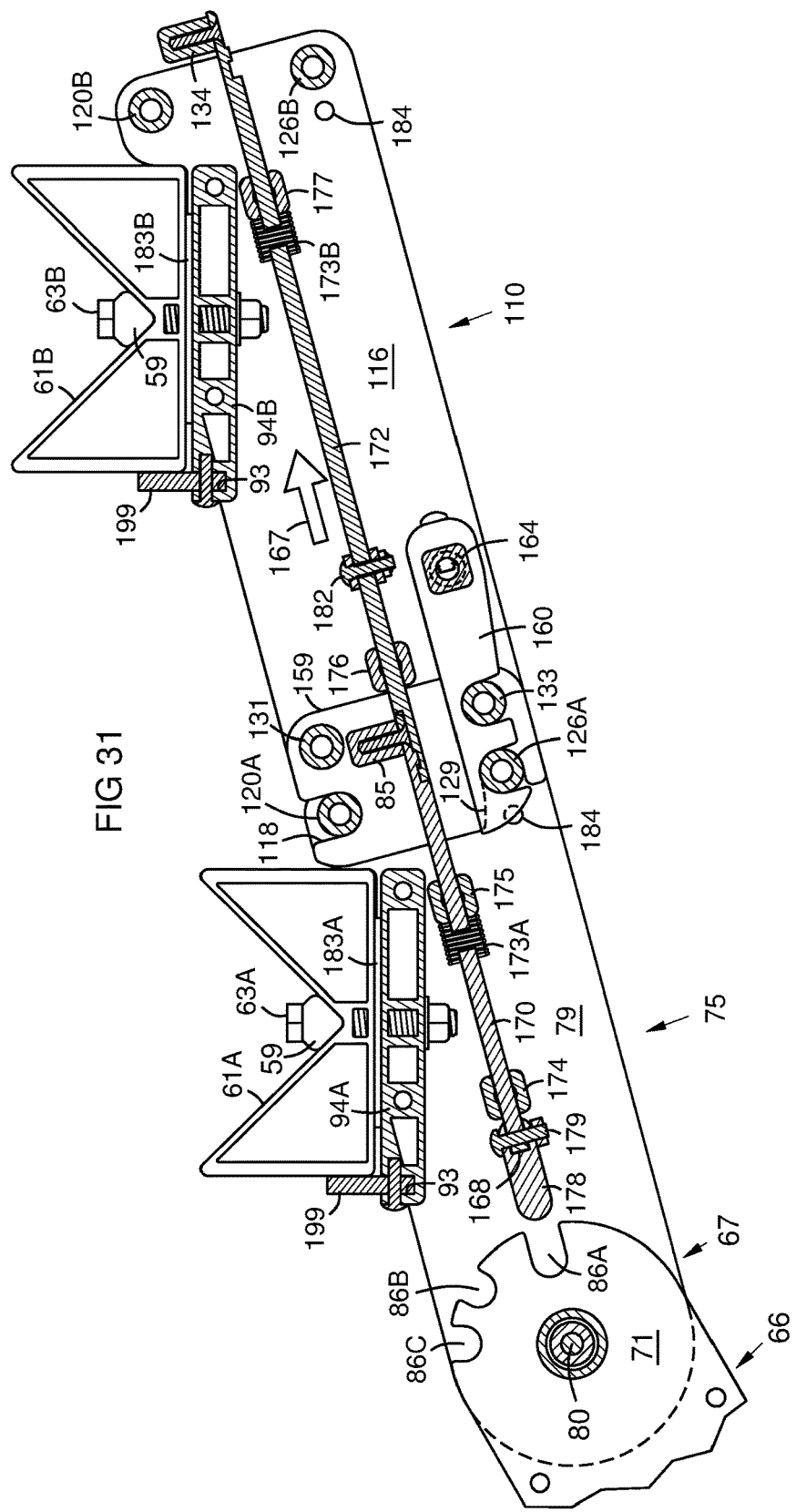

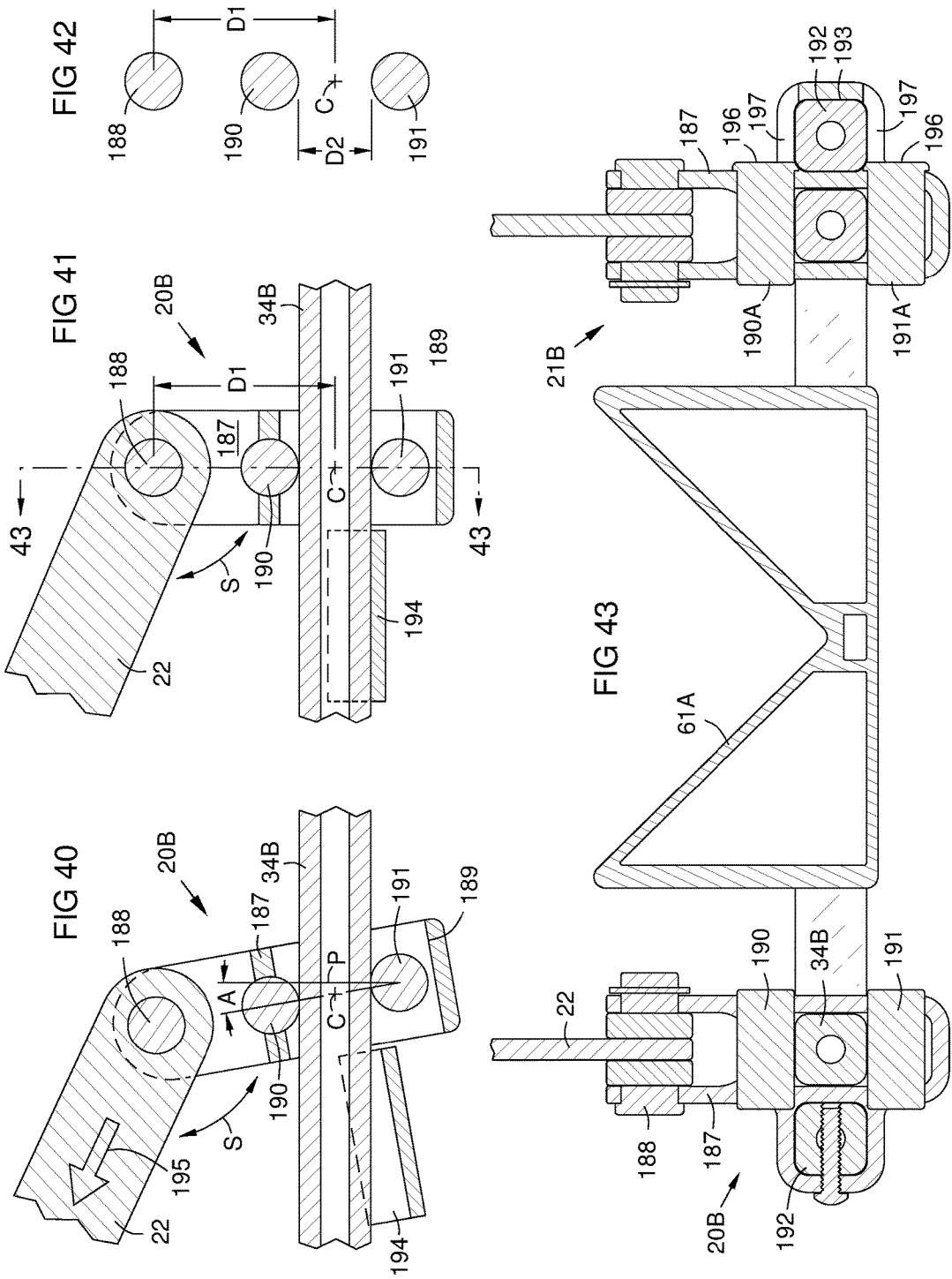

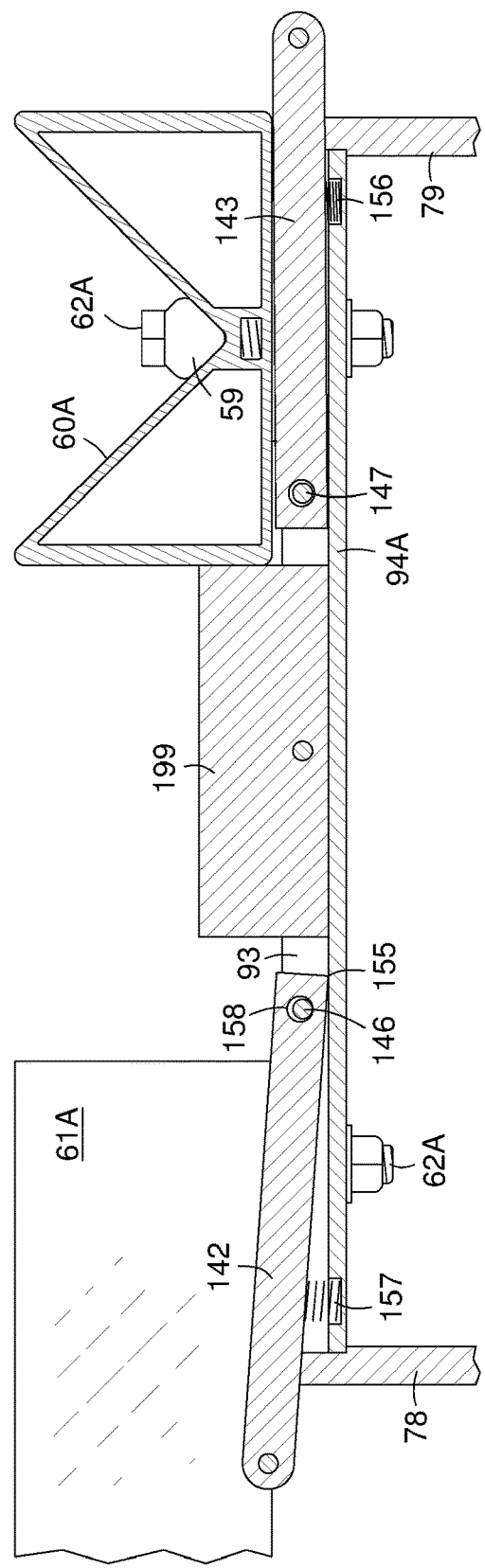

US 10,059,276 B2

CARRIER FOR A TWO WHEELED VEHICLE

CROSS-REFERENCE TO RELATED APPLICATIONS

This is a continuation-in-part of U.S. patent application Ser. No. 15/396,710 filed Jan. 2, 2017, which is incorporated by reference herein in its entirety.

FIELD OF THE INVENTION

This invention relates to carriers for two-wheeled vehicles, and particularly to bicycle carriers for mounting on a motor vehicle roof rack or trailer hitch receiver.

BACKGROUND OF THE INVENTION

Racks for carrying bikes on motor vehicles often use hangers, clamps, straps, or cams to hold the bike in the rack. These require multiple operations to secure or release the bike. Hangers and clamps can mar the finish of a bike assembly during vibration of a traveling vehicle. Straps are subject to loosening, tearing, and deterioration.

Bike wheels should not be free to spin in the slipstream of a motor vehicle, and the steering wheel of the bike should not be free to turn. Otherwise, damage to the bike and/or the motor vehicle can result. Many racks do not inherently secure the wheels, relying on the competence and discretion of the user to do so with straps.

U.S. Pat. No. 4,875,608 (Graber) shows a folding bike carrier mounted on the rear of a vehicle. Each wheel is strapped to a tray, and the bike assembly is clamped to the carrier. This design secures the wheels, but the straps and clamps have the disadvantages described above.

U.S. Pat. No. 3,659,762 (Kravitz) shows a bike carrier with deep wells for holding a bike by its wheels. The bike must be strapped to the wells, since it is not clamped by them. Otherwise the bike could fly upward during a bump in the road. There is no adjustment for different sized bikes, so the wells are a loose fit, requiring straps to eliminate play of the bike within the wells.

Some bike carriers require removal of the front wheel, and bolting or clamping of the front dropouts to the carrier. This is inconvenient, even with a quick-release hub on the bike and/or a quick-release dropout clamp on the carrier. The front wheel must be strapped individually to the carrier or stowed elsewhere, possibly bending the rim or spokes, or scratching the carrier or vehicle.

The present inventor has commercial success with a bike carrier described in part in U.S. Pat. No. 5,833,074, filed May 6, 1995. Since this patent issued the inventor has improved the design, added a trailer hitch receiver embodiment, and has sold vehicle roof rack and hitch receiver versions. The carrier described herein incorporates aspects from the above patent '074, intervening improvements that were on sale over a year before the priority date (Jan. 2, 2017), and further improvements not publicly disclosed as of the priority date. Intervening improvements applicable to both the roof rack and the hitch receiver versions include the following:

a) Wheel retention arms with two parallel side arms and a cross member, which, in combination, form an H-shape or inverted U-shape depending on the position of the cross member, which can be adjusted for different sized bike tires. Adjustment requires a wrench and is limited to a selection of alternate bolt holes on the parallel side arms. It is not infinitely adjustable.

b) The pivotal position of each wheel retention arm is controlled by a linear ratchet with shallow, symmetric ratchet teeth. The pawl can be over-rotated by the user in the release direction, causing drag on the pawl movement while opening the wheel retention arms.

A trailer hitch receiver version of the bike carrier with the following features were on sale for over a year before the priority date.

a) A main tray assembly with two aligned bicycle wheel trays to receive the front and back wheels of a bike. The main tray assembly is pivotally attached to a trailer hitch drawbar, allowing the assembly to pivot upward into a compact position behind a motor vehicle. The user must reach under the main tray assembly to reach the pivot release bar.

b) The two wheel trays pivot into a parallel position over the drawbar for compact shipping and storage without disassembly. The trays lock in the deployed position by respective levers, but the user must remember this. They do not automatically lock.

c) An add-on tray assembly can be bolted to the main tray assembly to carry a second bike or up to three bikes using two add-on assemblies. The user must reach under all tray assemblies to reach the tray assembly pivot release bar.

The present inventor also invented a quick-release drawbar mechanism as disclosed in U.S. Pat. No. 6,406,051 for use on his bike carrier. He later devised and sold a drawbar with a screw-operated internal rod that pushes a captive ball to extend from a side of the drawbar to lock it in the tubular hitch receiver.

Since the priority date of Jan. 2, 2017, the inventor has made further improvements disclosed herein.

SUMMARY OF THE INVENTION

Improvements herein over prior art that apply to both the roof rack and hitch receiver versions of the inventor's bike carrier include the following:

a) Infinite adjustability of the cross member position along the wheel retention arms without a wrench using a quick release mechanism to tighten and release the cross member anywhere along elongated slots in the side arms of the retention arms.

b) The pawl of the wheel retention arm ratchet has an over-rotation stop.

Improvements herein over prior art that apply to the inventor's hitch receiver embodiment of the bike carrier include:

a) The drawbar may have a spring-loaded push button that extends into the hitch receiver pin hole to both retain the drawbar and set its insertion depth in the receiver. A translation screw moves a follower that pushes the front of the drawbar upward against the roof of the tubular hitch receiver. This combination provides redundant retention and proper insertion depth.

b) A lever on the head of the translation screw provides a constantly attached wrench and a hole for a security lock that enforces proper insertion direction the lock.

c) A trigger bar on the back end of the main tray assembly controls the pivot of the assembly so the user does not need to stoop or kneel to reach the pivot release bar.

d) The add-on assembly has an add-on trigger bar that quickly connects to the trigger bar of the main tray assembly and provides a trigger at the back of the add-on assembly so the user does not need to kneel down and reach under two or three tray assemblies to reach the pivot release bar.

In combination the existing and new features on both the roof rack and hitch receiver versions of the present bike carrier provide:
- (a) Retains the bike only by the tires. Does not scratch the bike frame;
- (b) Quick infinite adjustment for bike wheels of different diameters without tools;
- (c) Bike loads/unloads quickly using only one operation;
- (d) No straps or other secondary retention needed;
- (e) Locks the bike steering to prevent damage;
- (f) Prevents the wheels from spinning in the vehicle slipstream.

In combination the existing and new features on the hitch receiver version of the present bike carrier provide:
- (a) Mounts quickly and securely to a trailer hitch receiver on a motor vehicle;
- (b) Add-on tray assembly for a second bike couples quickly to main tray assembly without tools;
- (c) A main tray assembly for carrying a first bike and add-on tray assemblies for additional bikes, both assemblies have a pivot selection trigger at the back end of the assemblies;
- (d) The two wheel trays for each bike quickly pivot between an aligned deployed configuration and a parallel compact shipping and storage configuration with automatic locking in the operational configuration.

BRIEF DESCRIPTION OF THE DRAWINGS

The invention is explained in the following description in view of the drawings that show:

FIG. 2 is a sectional view along line 2-2 of FIG. 1, showing a bike tire retained by a wheel retention arm.

FIG. 3 is a view as in FIG. 2 showing the wheel retention arm adjusted for a smaller tire diameter.

FIG. 4 is a sectional view along line 4-4 of FIG. 1, showing aspects of a ratchet mechanism for the wheel retention arm.

FIG. 5 is a perspective view of the wheel retention arm ratchet mechanism.

FIG. 6 is a sectional view taken along a line 6-6 of FIG. 4 with pawl locked.

FIG. 7 is a view as in FIG. 6 with pawl released.

FIG. 9 is a top view of the bike carrier of FIG. 8 with the wheel retention arms folded down to the wheel trays.

FIG. 10 is a sectional view of the drawbar and a main tray assembly taken on line 10-10 of FIG. 9.

FIG. 11 is a sectional view taken on line 11-11 of FIG. 10.

FIG. 12 is a bottom view of the drawbar and main tray assembly.

FIG. 13 is a side sectional view of a second drawbar embodiment in an insert/release position.

FIG. 14 is a sectional view taken on line 14-14 of FIG. 13.

FIG. 15 is a sectional view taken on line 15-15 of FIG. 13.

FIG. 16 is a side sectional view of the second drawbar embodiment in a tightened position.

FIG. 17 is a transverse sectional taken on line 17-17 of FIG. 16.

FIGS. 18-20 are a sequence of sectional views taken along line 18-18 of FIG. 9 showing the operation of coupling an add-on tray assembly to a main tray assembly.

FIG. 21 is a sectional view of the add-on tray assembly coupled to the main tray assembly as viewed from line 10-10 of FIG. 9 after coupling.

FIG. 22 shows a view as in FIG. 21 with the add-on trigger being pulled back, releasing the pivot lock bar from the pivot slot via the main trigger and main trigger bar.

FIG. 23 is a perspective view of a translation screw with attached lever.

FIG. 24 is a partial top view of a side plate of the main tray assembly and a side plate of the add-on tray assembly locked together with a padlock.

FIG. 25 is a sectional view of a 1.25 inch drawbar with a 2-inch drawbar adapter.

FIG. 27 is a top view of a main tray assembly and an add-on tray assembly with trays and tray crossbars removed for clarity.

FIG. 28 is a side sectional view taken on line 28-28 of FIG. 27.

FIG. 29 is a side sectional view of the coupling hook of FIG. 28.

FIG. 30 is a side view of the coupling plate of FIG. 28.

FIG. 31 is a side sectional view as in FIG. 28 with the tray assembly pivot lock released.

FIG. 40 is a sectional view of the ratchet mechanism of FIG. 39 in the locked position, taken on a vertical plane through the ratchet bar.

FIG. 41 is a sectional view of the ratchet mechanism of FIG. 40 in the released position.

FIG. 42 is a schematic sectional view of dimensions among elements of the pawl.

FIG. 43 is a sectional view taken on line 43-43 of FIG. 41 with a wheel tray, showing two opposed ratchet mechanisms for pivot control of a bike wheel retention arm.

FIG. 46 is a sectional view taken on line 46-46 of FIG. 44.

GLOSSARY

"Bike" herein means a two-wheeled vehicle, including velocipede bicycles and motorcycles.

"Front" and "back" are oriented with a motor vehicle to which the bike carrier is attached. Thus, a "side view" of the roof rack carrier shows the side of a bike in the carrier, while a "back view" of the hitch receiver carrier shows the side of the bike.

"H-shaped or inverted U-shaped" herein includes a range of positions of the cross member on the wheel retention arms. If the cross member is at the top of the side members it becomes an inverted U-shape. "Longitudinal" means parallel to the longest dimension of the subject component.

"Transverse" means perpendicular to the longest dimension of the subject component.

DETAILED DESCRIPTION OF THE INVENTION

The inventor has devised improvements to the "Fast-Loading Protective Bike Rack" described in U.S. Pat. No. 5,833,074. The improvements are beneficial individually and especially in combination, making the bike carrier easier to use, easier to manufacture, and lighter. Two main versions of the bike carrier are disclosed: a) a carrier for a car roof rack; and b) a carrier for a trailer hitch receiver.

Figure 1:
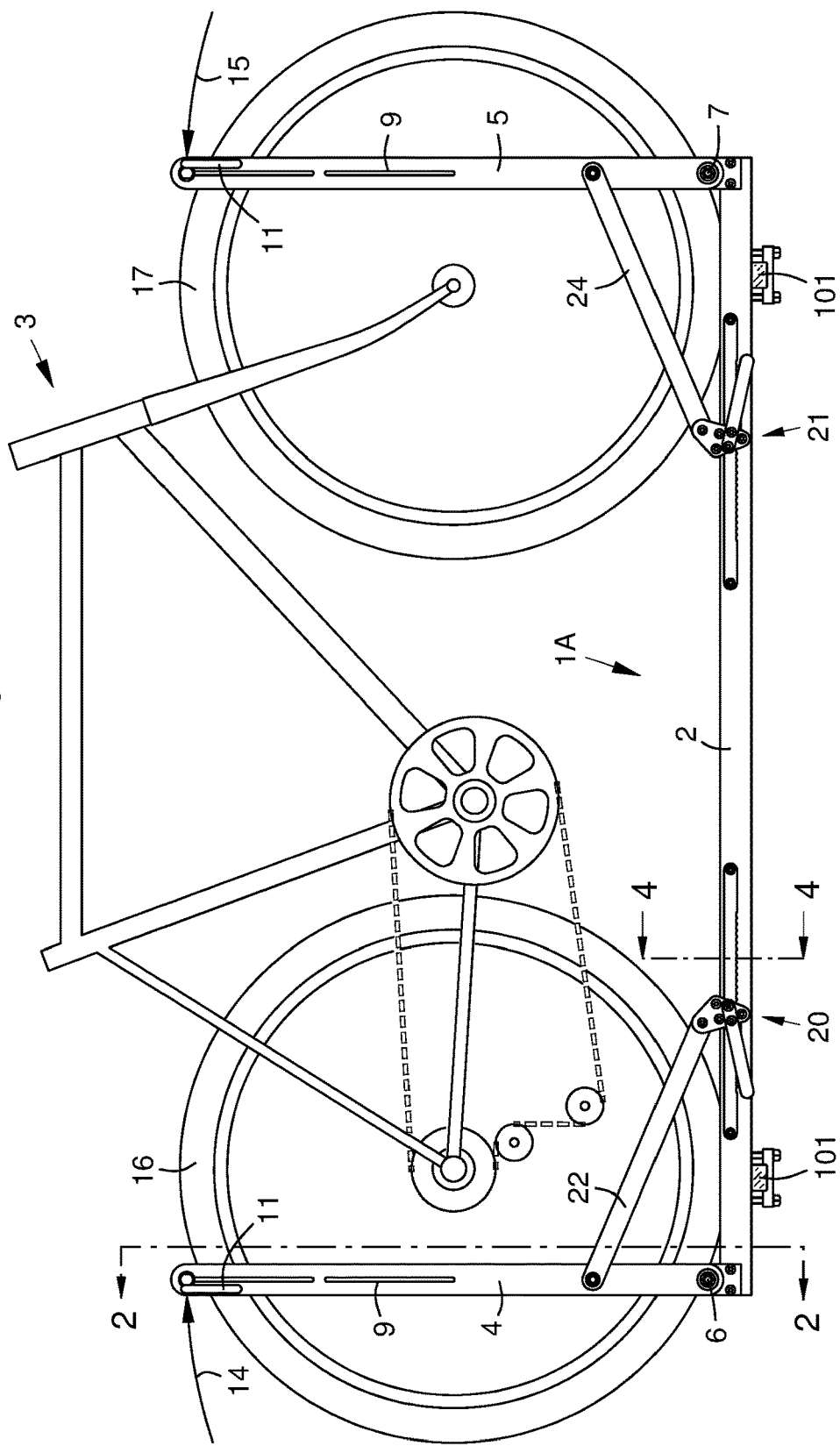
FIG. 1 is a side view of a bike carrier for a car roof rack according to aspects of the invention.

FIG. 1 is a side view of a bike carrier 1 A mounted on a car roof rack 101. An elongated horizontal tray 2 receives the tires 16, 17 of a bike 3. The tray 2 may be a V-channel or U-channel extrusion that is concave upward. A wheel retention arm 4, 5 is attached pivotally 6, 7 near each end of the tray. The retention arms are H-shaped or inverted U-shaped as later shown. Each wheel retention arm may have elongated slots 9 to adjust the position of a cross member (later shown) for different wheel diameters via a quick-release lever 11. Each retention arm 4, 5 pivots inward 14, 15 until the cross member contacts the tire 16, 17 of the nearest wheel. The arm is locked against this tire by a ratchet mechanism 20, 21 acting through a stay 22, 24 connected between the pawl and the retention arm 4, 5. This causes the tires to be bracketed between the arms, securing the bike in all directions by its tires. The ratchet mechanism prevents outward pivoting of the wheel retention arms unless intentionally released. The retention arms pivot fully inward to the tray when the rack is not in use. Once adjusted and positioned for a given bike size, only one of the retention arms needs to be pivoted for insertion and removal of a bike of that size.

Each arm contacts the tire of the nearest wheel at a point above and outward from the wheel axle with respect to the bike, preferably for example about 45 degrees upward from hub level. This brackets and blocks the bike from moving, both along the tray and vertically. The bike is held firmly in place and cannot bounce upward or roll off the tray. The arms contact only the tires.

FIG. 2 is a sectional view taken along line 2-2 of FIG. 1, showing a tire 16 in the tray 2 and a wheel retention arm 4 contacting the tire with a cross member 25. The wheel retention arm has two side arms 4A, 4B attached by coaxial pivot points 6A, 6B to opposite sides of the tray 2. The cross member 25 is attached between the two side arms through the slots 9 (FIG. 1) in the side arms by means of a quick release lever 11 mechanism. This can be a conventional quick release cam device for attaching bicycle wheels to the forks of a bicycle. Preferably, the side arms 4A, 4B should have a spacing at or near a widest conventional bicycle dropout spacing so wide tires can be accommodated and an off-the-shelf wheel quick release device can be used. The cross member includes a retention arm separator 27, which may be formed in a bi-conic shape with a waist to receive a bike tire as shown.

FIG. 3 shows the same viewpoint as FIG. 2, with the cross member 25 moved downward for a smaller tire 30. The cam lever 11 is shown in an alternate loosened position 11 B. The cross member 25 and side arms 4A, 4B form an H-shaped or inverted U-shaped configuration, depending on the position of the cross member. The quick-release mechanism is shown partly in section to show the shaft 31 or skewer passing through the separator 27. The shaft 31 passes through the slots 9 and the separator 27 from the cam 28 to a nut 29. Cam tension on the shaft is adjusted with the nut 29, then the nut does not need to be loosened again, and can remain at a setpoint, optionally with assistance from a thread locking compound or other means. Alternately, the shaft 31 may be embodied as a bolt with a head on the left end and a threaded lever on the right end instead of the cam 28, and the threaded lever is rotated to tighten and loosen the bolt.

FIG. 4 is a sectional view taken along line 4-4 of FIG. 1, showing aspects of the ratchet mechanism 20, more fully shown later. A linear ratchet bar 34 has a pawl assembly 36 that holds a finger 38 against the bottom side of the ratchet bar. A pawl release lever 40 releases the finger from the ratchet bar. An over-rotation stop 42 prevents over-rotating the pawl assembly in the release direction as later described.

FIG. 5 is a perspective view of the linear ratchet mechanism 20 that holds the wheel retention arm 4 tight against a tire. The wheel retention arm has two parallel side arms 4A, 4B attached to respective opposite sides of the tray 2 at an end of the tray as shown. The wheel retention arm 4 is held against the tire by a stay 22 between the retention arm and the pawl frame 36 of the ratchet mechanism 20. A linear ratchet bar 34 has a bottom side which may have teeth 35. Upward force on a release arm 40 releases the pawl, allowing the retention arm 4 to be pivoted outward to mount or dismount a bike in the tray.

FIG. 6 is a sectional view of the ratchet mechanism 20 taken on line 6-6 of FIG. 4. A torsion spring 44 urges the pawl frame 36 in a direction 48 that moves the pawl finger 38 against the teeth 35. Tension on the stay 22 is caused by the cross member of the retention arm 4 being jammed against the bike tire. This tension jams the finger 38 against the teeth due to a follower 50 on the top side of the ratchet bar acting as a fulcrum. Any force that tries to pivot the retention arm outward locks the pawl on the ratchet harder.

FIG. 7 is a sectional view of the ratchet mechanism as in FIG. 4, but in the release position. Upward manual force on the pawl lever 40 (FIG. 5) opposes and overrides the force 46 of the torsion spring 44, and pivots 52 the pawl frame 36 to move the finger 38 away from the teeth 35. If the pawl frame is over-rotated 54, the finger 38 will drag along the teeth during outward pivot of the wheel retention arm to release the bike. An over-rotation stop 42 prevents this by contacting the top of the ratchet bar 34, stopping the rotation 52 of the pawl frame 36 caused by a user lifting the lever 40. It can be stopped at the maximum distance of the finger 38 from the bottom of the ratchet bar.

Unlike a conventional ratchet, the pawl teeth 35 may be shallow and symmetric, and may be produced by a series of side mill cuts, where each milling produces a cylindrical concavity as little as 0.010 inch (0.25 mm) deep. This is because the pawl design as shown works even with a toothless ratchet bar and finger of aluminum, but providing shallow teeth/valleys as shown improves the grip of the pawl finger 38 on the ratchet bar 34.

Figure 8:
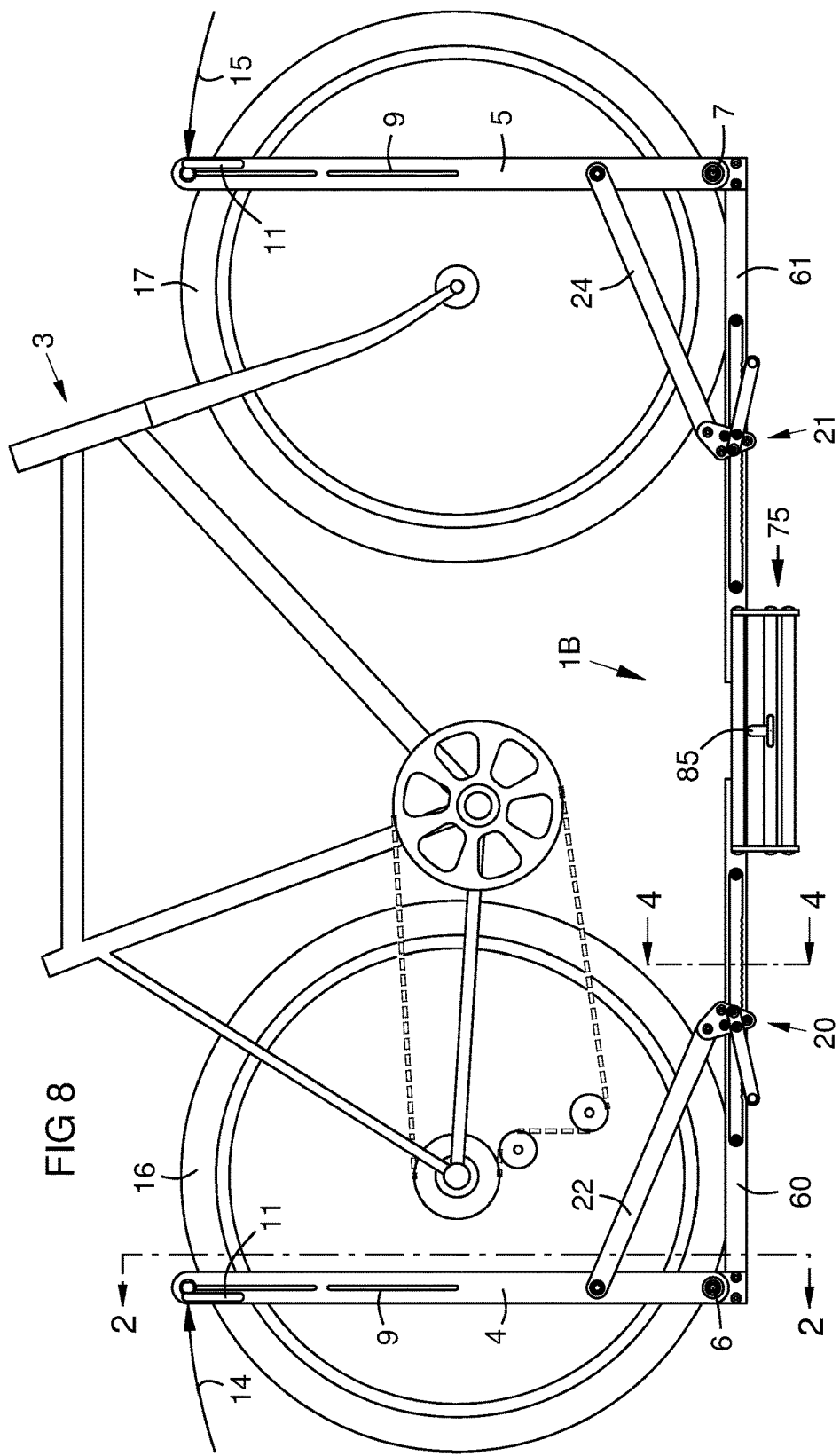
FIG. 8 is a back view of a bike carrier for a trailer hitch receiver according to aspects of the invention.

FIG. 8 is a back view of a bike carrier 1B for a trailer hitch receiver according to aspects of the invention. A bike 3 is mounted on the carrier by placing its wheels 16, 17 in respective wheel trays 60, 61. These trays may be extrusions such as U-channel or V-channel that are convex upward to retain the wheels and lock the steering of the bike. This bike carrier has the same elements and operation as the roof rack carrier described above, but includes additional elements related to mounting the carrier to the receiver hitch of a vehicle. It may provide a separate tray 60, 61 for each wheel, enabling the trays to be folded together over the drawbar assembly for compact shipping and storage.

FIG. 9 is a top view of the bike carrier of FIG. 8 with the wheel retention arms 4A, 4B and 5A, 5B folded down to the wheel trays 60, 61. A trailer hitch drawbar 64A is attached to the trays via a drawbar assembly 66 comprising a horizontal crossbar 68 attached to the drawbar, and left and right vertically oriented pivot plates 70, 71 attached to the crossbar. The drawbar has a spring-loaded push button 65A that locks the drawbar in the hitch receiver. It has a mechanism operated by a lever 96 as later described for tightening the drawbar in the receiver. A padlock 69 pay secure the drawbar in the receiver. A main tray assembly 75 comprises left and right side plates 78, 79 attached to the drawbar assembly on a horizontal pivot axis 80, allowing the tray assembly 75 to pivot upward about the axis 80 to a compact upward position behind the motor vehicle. The pivot axis may be implemented by a pivot axle journaled in a pivot cross member 81 between the pivot plates 70, 71 that serves as a structural member of the drawbar assembly. The pivot position is locked with a pivot lock bar 82 operated by a trigger bar 84 via a manual trigger 85 at the back of the main tray assembly 75. The trays 60, 61 are mounted to the main tray assembly 75 by respective pivot attachments 62, 63, so they can pivot between the operational co-aligned laterally extending position shown and a compact parallel position over the drawbar assembly 66 for shipping and storage as later shown.

An add-on tray assembly 110 with left and right side plates 115, 116 is shown in an approach position for coupling to the main tray assembly 75 to support a second bike on the carrier. An add-on trigger 134 is provided at the back of the add-on tray assembly for convenient control of the carrier pivot lock bar 82. The add-on trigger is linked to the pivot lock bar 82 via an add-on trigger bar 108 with a latch 112 that hooks over the main trigger 85, thus controlling the main trigger bar 84 as later described. Left and right upward facing slots 117, 118 receive an upper coupling bar 120 on the main tray assembly as later described. Left and right downward facing coupling hooks 123, 124 on the add-on assembly hook a lower coupling bar (not seen here) on the main tray assembly as later described.

First and second spools 99, 100 may extend laterally outward from the main tray assembly 75 and the add-on assembly respectively to retain the shackle of a lock in a waist of the spools, preventing unauthorized removal of the add-on tray assembly from the main tray assembly as later shown. The spools may be formed as washers or spacers for a machine screw that connects a horizontal coupling bar 120 of the main assembly 75 and a horizontal crossbar 131 of the add-on assembly to a respective side plate 78, 115. These may be upper or lower bars.

FIG. 10 is a side sectional view of the drawbar 64A, drawbar assembly 66, and main tray assembly 75 taken on line 10-10 of FIG. 9. This drawbar embodiment 64A is suitable for a 1.25 inch hitch receiver for example. A crossbar 68 is attached to the drawbar, and a right pivot plate 71 is attached to the crossbar. The main tray assembly 75 is pivotally connected 80 to the drawbar assembly. The right pivot plate 71 and a mirror image left pivot plate (not shown here) provide a selection of pivot lock slots 86A-C. A pivot lock bar 82 is slidably mounted on the main tray assembly 75, and falls into a selected one of these slots under force of a spring 83. A trigger bar 84 extends from the lock bar to a trigger 85 at the back of the main tray assembly 75. Pulling the trigger releases the pivot bar 82 from the slot 86A. The trigger bar 84 is slidably mounted through trigger bar crossbars 89 in the main tray assembly 75. The trigger bar may have a floating connection to the pivot lock bar. For example, clearance 90 may be provided in the trigger bar 84 around screws 91 that couple the trigger bar to the lock bar. The floating connection may allow at least 0.1 or 0.2 degrees of angular play between the pivot lock bar and the trigger bar in a plane normal to the pivot axis 80. Such connection allows the lock bar 82 to slide easily into and out of the slots 86A-C without binding, despite minimal clearance between the lock bar and the slot. A tray lock bar 92 is slidably mounted in a vertical slot 87, and is spring loaded upward to a stopping point immediately beside the trays, as shown here by right tray 61. The tray lock bar is pushed down to release the trays so they can be rotated together over the drawbar assembly 66 via their pivot connections 63 to the main tray crossbar 94.

The drawbar 64A has a translation screw 95 operated by a lever 96 to move a follower 97A along a ramp 98 or angled slot to jam the front end of the drawbar upward against the inner surface of the hitch receiver (not shown), locking it therein. The front end of the drawbar is pushed in the same direction as the weight of the bike carrier pivots it within the receiver, so bouncing of the motor vehicle does not stress the follower or screw.

The lever 96 may be locked with a padlock 69 inserted through a hole 96A in the lever so that the case of the padlock extends over the crossbar 68. This blocks lever rotation by the case of the padlock hitting the crossbar, securing the drawbar to the receiver. The direction of lock insertion may be enforced by countersinking 96B the hole 96A only on the back end (right end in this view) and/or by filleting 96C the end of the lever on only the back edge. The hole 96A is spaced from end of the lever by an amount that barely allows the padlock to close when the case of the lock is forward from the lever as shown. The padlock cannot be closed in the other direction due to the curvature of the shackle interfering with the unchamfered front edge of the hole 96B and/or the un-filleted front edge of the end of the lever. This orientation of the lock prevents the lever from being moved past the crossbar by the top of the shackle fitting between them. FIG. 11 is a sectional view taken on line 11-11 of FIG. 10 showing the spring-loaded push button 65A in the drawbar 64A.

FIG. 12 is a bottom view of the drawbar 64A, drawbar assembly 66, and main tray assembly 75 as previously described. Upper and lower coupling bars 120, 126 are used as later describe to attach an add-on tray assembly to carry a second bike on the same carrier. The lower coupling bar 126 is cut away to more clearly see the end of the trigger bar 84. A nut 99 on a coupling bar 120 or 126 may be formed with a waist to hold the shackle of a padlock in conjunction with an adjacent nut on the add-on tray assembly to secure the add-on tray assembly to the main tray assembly 75 as later shown.

FIG. 13 is a side sectional view of a second drawbar embodiment 64B in an insert/release position. This embodiment is suitable for example for a 2-inch hitch receiver. FIG. 14 is a sectional view taken on line 14-14 of FIG. 13. A crank lever 96 turns a translation screw 95 to move a follower 97B along a ramp or angled slot 102 to extend the follower below the drawbar as shown in FIGS. 16 and 17, pushing the front end of the drawbar upward against the upper inner surface of the hitch receiver (not shown). The translation screw may be mounted through a pivot element 104 to accommodate the changing angle of the screw shaft. The crank lever may have a hole 96A for a lock shackle.

FIG. 15 is a sectional view taken on line 15-15 of FIG. 13, showing a push button 65B urged laterally outward from a side of the drawbar 64B. When the drawbar 64B is inserted into a hitch receiver, this button 65B falls into a hole in a side wall of the receiver that is conventionally available for a through-pin. FIG. 16 is a side sectional view of the second drawbar embodiment in a tightened position. FIG. 17 is a transverse sectional taken on line 17-17 of FIG. 16.

FIGS. 18-20 are a sequence of sectional views taken along line 18-18 of FIG. 9 to illustrate the operation of mounting of an add-on tray assembly 110 to a main tray assembly 75. Upper and lower horizontal coupling bars 120, 126 are disposed at the back of the main tray assembly 75. The add-on tray assembly has mirror image left and right side plates—left 115 and right 116—the right plate 116 being shown here. Left and right upward facing coupling slots 118 are disposed at a top front part of the add-on assembly. Left and right downward facing pivoting coupling hooks 124 are disposed at a bottom front part of the add-on assembly. In FIG. 18 the add-on assembly is moved diagonally upward 122 as shown so that the upward facing coupling slots 118 slip over the upper coupling bar 120 of the main tray assembly 75.

FIG. 19 shows the add-on assembly being rotated downward 127 around the upper coupling bar 120 of the main tray assembly in the upward facing coupling slots 118 so that the coupling hooks 124 engage the lower horizontal coupling bar by climbing over it. At the same time, the lower coupling bar 126 slips into forward facing slots 129 in the forward bottom end of the add-on assembly. The coupling hook 124 has a surface 128 with a geometry that causes it to climb 125 over the lower coupling bar 126 when pressed against it during rotation 127 of the add-on assembly. This climbing overrides the force of a spring 130 until the hook falls over the lower coupling bar under the spring force. The add-on assembly is now firmly locked onto the main tray assembly, with no tools required. To release it, a handle 132 between respective backward extending levers of the left and right coupling hooks is pushed downward, and the motions of FIGS. 19 and 18 are reversed. The coupling and decoupling operations can be done quickly. FIG. 20 shows the resulting coupling of the add-on tray assembly to the main tray assembly. The coupling is positive and strong enough to withstand bouncing of the motor vehicle with bikes mounted on both assemblies 75, 110 and a further add-on assembly if needed.

FIG. 21 is a side sectional view of the add-on tray assembly coupled to the main tray assembly as viewed from line 10-10 of FIG. 9 after coupling. This shows how the trigger bar 84 of the main tray assembly 75 is operated by an add-on trigger 134 at the back of the add-on tray assembly for convenience. A spring 83 urges the pivot lock bar into the slots 86A-C. Multiple add-on tray assemblies can be chained in sequence, each one interconnected to the trigger bar of the previous assembly. The add-on trigger bar 108 has a latch 112 mounted on a pivot attachment 114 and has a finger grip 119. This latch is seen from the top in FIG. 9. FIG. 22 shows a view as in FIG. 21 with the add-on trigger 134 being pulled back, releasing the pivot lock bar 82 from the pivot slot 86A via the main trigger 85.

FIG. 23 is a perspective view of a translation screw 95 with attached lever 96. The translation screw may be a conventional bolt with a head 95A having external flats as shown. The lever 96 may be formed as a wrench, having a depression 96E with opposed internal flats matching and receiving the opposed external flats of the bolt head. A bolt hole 96D is in the bottom of the depression. The lever 96 slides over the bolt from the end opposite the head until the head bottoms in the depression, where it is bracketed by the internal flats. The lever 96 is retained on the bolt 95 by the bolt head, and will not come off without removing the bolt from the drawbar, which cannot be done if the drawbar is tight in the receiver and the lever is locked as previously described. This lever design enables use of a conventional bolt for the translation screw while providing an attached lever for turning the screw and security. The opposite end of the lever has a hole 106 for the shackle of a lock.

FIG. 24 is a partial top view of a side plate 78 of the main tray assembly and a side plate 115 of the add-on tray assembly when the two assemblies are coupled. Two spools 99, 100 extend outward from these respective side plates, and are adjacent. A shackle 140 of a lock 141 fits in the waist of the spools, locking them together. The spools may be formed as nuts, washers, or spacers for a machine screw that connects a horizontal coupling bar 120 of the main assembly 75 and a horizontal crossbar 131 of the add-on assembly to a respective side plate 78, 115. These may be upper or lower coupling bars. Upper bars 120 and 131 are shown here.

FIG. 25 is a transverse sectional view of a 1.25 inch drawbar 64A with a 2-inch drawbar adapter 150. The adapter may have an inverted U-shape in section as shown, and may be laterally asymmetric to provide space for a push button 65C. A spring 152 in the adapter for the button may be a round wire that loops around the back of the button in a groove therein as shown and extends forward or backward in an extruded chamber 154 of the drawbar, providing two parallel wires acting as both a leaf spring and a button retainer.

Figure 26:
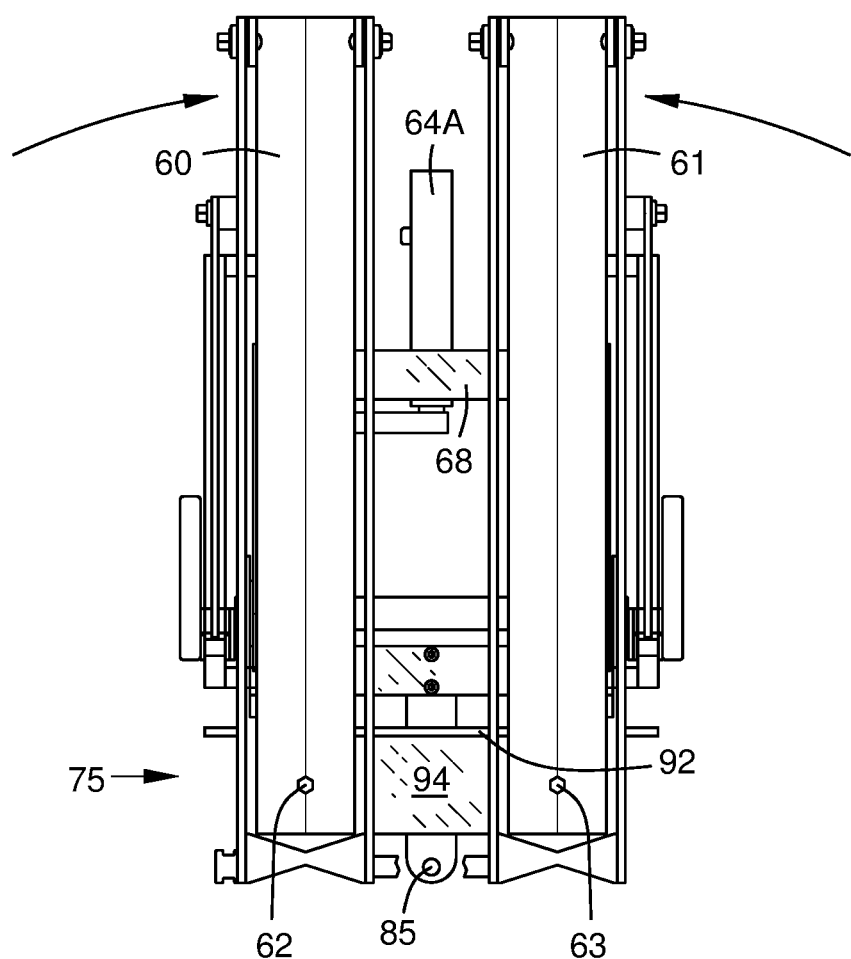
FIG. 26 is a top view of a main tray assembly with trays folded for shipping.

FIG. 26 is a top view of a main tray assembly 75 with trays 60, 61 folded forward about their pivotal attachments 62, 63 for shipping. No assembly is required by the user on receipt of the product. They just unfold the trays, which automatically lock in the open position via tray lock bar 92.

The drawbar designs 65A, 65B, and the drawbar adapter 150 may be used with other accessories for attachment to a trailer hitch receiver besides bike carriers, such as a lawnmower carrier, spray equipment, a tailgate table set, or a barbeque grill as examples.

FIG. 27 is a top view of a main tray assembly 75 and an add-on tray assembly 110, in which the trays and tray crossbars are removed for clarity. The main tray assembly 75 is pivotally mounted to a trailer hitch drawbar 64A by a pivot mechanism 67 with a horizontal pivot axis 80. A pivot lock bar 178 slides forward and backward within slots in the main tray assembly side plates 78, 79. In the forward position, it enters selected pivot lock slots in the left and right pivot plates 70, 71 to fix a selected pivot position of the main tray assembly relative to the drawbar. A main trigger bar 170 is slidably mounted in the main tray assembly 75. It has a manual grip or trigger 85 at the back end of the main tray assembly. Pulling backward on the trigger pulls the pivot lock bar 178 out of the currently selected pivot lock slot, releasing the pivot position. A second trigger bar 172 in the add-on tray assembly connects to the main trigger bar 170 when the add-on tray assembly is coupled to the main tray assembly. It has a second manual grip or trigger 134 for controlling the pivot mechanism 67 from the back of the add-on tray assembly. A coupling plate 159 on each side plate 115, 116 of the add-on tray assembly 110 provides coupling slots 117, 118. In an embodiment, a coupling hook 160 is manually operated by a coupling hook lever 162 outside a side plate 116 of the add-on tray assembly via a coupling hook crossbar 164 that spans between the side plates 115, 116 and is rotatably mounted in each side plate. It may be journaled in a stepped hole 165 in each side plate. In one embodiment, the coupling hook crossbar 164 is frictionally journaled in each side plate to hold the coupling hook in any position within a range. This causes the hook to stay in the raised position, allowing the user to move their hand from the lever to a convenient lifting position on the add-on tray assembly 110. An upper coupling bar 120A is shown. A lower coupling bar 126A (FIG. 28) is hidden below it.

In another embodiment, the coupling hook crossbar 164 is freely rotatably mounted to the side plates 115, 116, and is held in the closed position by a spring 166. This allows the coupling hook 162 to climb over the lower coupling bar and close on it automatically during coupling as previously described. The coupling hook 160 may be located between the side plates 115, 116, for example adjacent the trigger bar 172 as shown. A second coupling hook may be provided on the same coupling bar 164 at a different lateral position if wanted. A hole 163 may be provided in the coupling hook lever 162 for the shackle of a security lock that secures the lever to the main tray assembly when the hook 160 is in the closed position, preventing theft of the add-on tray assembly from the main tray assembly. The coupling hook retains the lower coupling bar in the lower coupling slot, preventing separation of the add-on tray assembly from the main tray assembly.

In an embodiment, the front end 185 of the add-on trigger bar 172 automatically connects to the back end of the main trigger bar 170 as later shown when the add-on tray assembly 110 is coupled to the main tray assembly 75. Each trigger bar 170, 172 may pass through a horizontal slot in at least two trigger bar crossbars 174-175 and 176-177 to slidably retain the trigger bar in the respective tray assembly 75, 110. The main trigger bar 170 may be inserted into a horizontal slot 168 in the pivot lock bar 178. It may be retained by a bolt or pin 179. This allows the trigger bar 170 to provide a centered pull on the pivot lock bar. The slot 168 may enforce a perpendicular relationship between the trigger bar and the pivot lock bar while allowing vertical play as later described.

Each trigger bar 170, 172 is urged forward by a spring 173A. The spring is not shown in the add-on trigger bar 172 to clarify the spring chamber 180. The spring chamber may be a generally H-shaped cut through the trigger bar that forms a central mandrel 180A for the spring with an entrance gap 180B for installation of the spring. This allows each spring 173A, 173B (FIG. 28) to provide a centered spring force on the respective trigger bar 170, 172, by pushing directly against the crossbar 175, 177 through which the trigger bar passes. A forward stop 182 on the add-on trigger bar contacts a crossbar 176 to stop the add-on trigger bar in position for automatic connection to the main trigger bar 170 as later shown.

FIG. 28 is a side sectional view taken on line 28-28 of FIG. 27. A bike wheel tray 61A is shown in the main tray assembly 75. A bike wheel tray 61 B is shown in the add-on tray assembly 110. The trays 61A, 61 B are pivotally mounted to the tray crossbars 94A, 94B, for example by bolts 63A, 63B and low-friction spacers 183A, 183B. Each bolt may pass through a tray holding bar 59 that distributes pressure from the bolt head to the bottom of the tray. This allows the tray to have a narrow bottom for narrow tires. The trays are mounted on a top side of each tray assembly to hold a bike or bikes above the assemblies for carrying the bikes behind a motor vehicle.

A tray rotation stop 199 and tray position lock levers, later shown, may be mounted in a slot 93 in the tray crossbar 94A, 94B to prevent the tray from pivoting forward into the compact storage position. The user pushes each tray lock lever down to allow the tray to pivot into the compact storage position. Alternately, a tray lock bar 92 as previously described (FIGS. 10 and 26) may be slidably mounted in the slot 93 and urged upward by a spring to a stopping point beside each tray. If a tray lock bar 92 is used, it may have depressions in its upper surface to receive the width of each tray in the compact storage position to retain each tray in the storage position.

A slot 168 in the pivot lock bar 178 may fit the front end of the trigger bar 170 closely around the sides and front end of the trigger bar to enforce a perpendicular relationship between the trigger bar and the pivot lock bar, but may provide enough vertical clearance to allow at least 0.1 degree of angular play between the pivot lock bar and the trigger bar in a plane normal to the pivot axis 80. This enables the pivot lock bar to slide in and out of each of the pivot lock slots 86A-C without binding, by accommodating to the exact angle of each pivot lock slot. The pin 179 may provide a floating connection that transmits linear force from the trigger bar to the pivot lock bar while allowing the angular play in the slot 168.

Upper and lower coupling bars 120A, 126A are shown on the back end of the main tray assembly 75. Upper and lower coupling bars 120B, 126B are shown on the back end of the add-on tray assembly 110 to attach a further add-on tray assembly if wanted. Upper and lower structural crossbars 131, 133 are shown near the front end of the add-on tray assembly. A hole 184 may be provided in a side plate 79, 116 of each tray assembly 75, 110 corresponding to a hole 163 (FIG. 27) in the coupling hook lever 162 (FIG. 27) to lock the coupling hook in the closed position via a security lock shackle inserted through the lever.

FIG. 29 is a side sectional view of the coupling hook 160. In this embodiment, it is pivotally mounted on a coupling hook crossbar 164 of the add-on tray assembly aft of the lower structural crossbar 133. It has a first slot 160A for the lower coupling bar 126A of the main tray assembly, and a second slot 160B for the lower crossbar 133 of the add-on tray assembly. In the closed position shown in FIG. 28, the hook retains the lower coupling bar 126A in the lower coupling slot 129. This positively connects the add-on tray assembly to the main tray assembly in combination with upper coupling slots 117 (FIGS. 27) and 118 retaining the upper coupling bar 120A, and lower coupling slots 129 retaining the lower coupling bar 126A.

A machine screw 160C may be threaded into the back end of the coupling hook and inserted into an unthreaded hole in the hook crossbar 164 to attach the hook to the crossbar. This allows the hook slide slightly along the machine screw within fit tolerances between the hook and crossbar 164 to accommodate to distance tolerances between the hook crossbar 164 and the two hooked bars 126A and 133, allowing the hook to slide more easily over the two bars.

FIG. 30 is a side view of a coupling plate 159 that may be attached to, or integral with, the side plate 116 at the front end of the add-on tray assembly. It has an upper coupling slot 118 that slides over the upper coupling bar 120A, and a lower coupling slot 129 that is oriented circumferentially relative to a circle 135 centered in the upper coupling slot. When the upper coupling bar 120A is fully inserted in the upper coupling slot 118, the lower coupling slot can slide over the lower coupling bar 126A by rotating the add-on bike carrying tray assembly 116 about the upper coupling bar (arrow in FIG. 32). At this point, the upper coupling bar cannot escape the upper coupling slot until the add-on bike carrying tray assembly is rotated upward to separate the lower coupling slot from the lower coupling bar. A mechanism exemplified by the hook 160 on the add-on bike carry tray assembly, retains the lower coupling bar in the lower coupling slot. A coupling plate 159 may be attached to the front inside surface of each side plate 115, 116 of an add-on tray assembly 110 as shown in FIG. 27.

Alternately (not shown), the coupling plate 159 may be vertically mirrored such that coupling slot 118 is downward facing at the bottom to receive coupling bar 126A, and coupling slot 129 is forward facing at the top to receive coupling bar 120A. In this embodiment, the hook 160 is located at the top front of the add-on assembly, and may hook over the top coupling bar 120A from above.

FIG. 31 shows the trigger bars 170, 172 pulled back 167 by the trigger 134 at the back of the add-on tray assembly 110, releasing the pivot lock bar 178 from the pivot lock slot 86A. This allows the tray assemblies 75, 110 to pivot upward to a selected slot 86B or 86C for a compact position behind the motor vehicle when bikes are not being carried.

Figure 32:
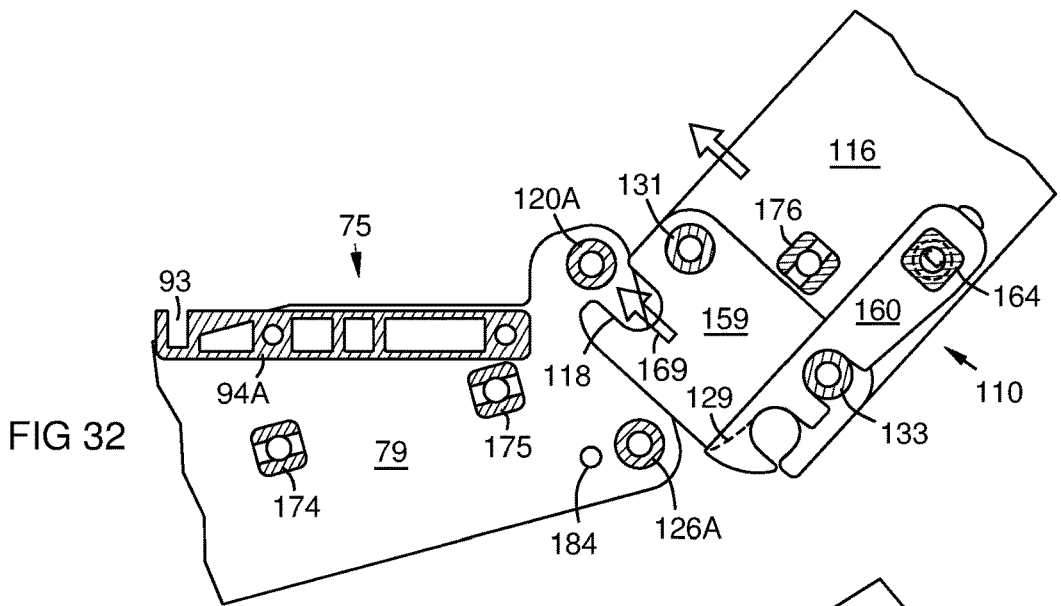
FIG. 32 is a sectional view taken on line 28-28 of FIG. 27 less the trigger bars, showing an add-on tray assembly approaching a main tray assembly for coupling.
Figure 33:
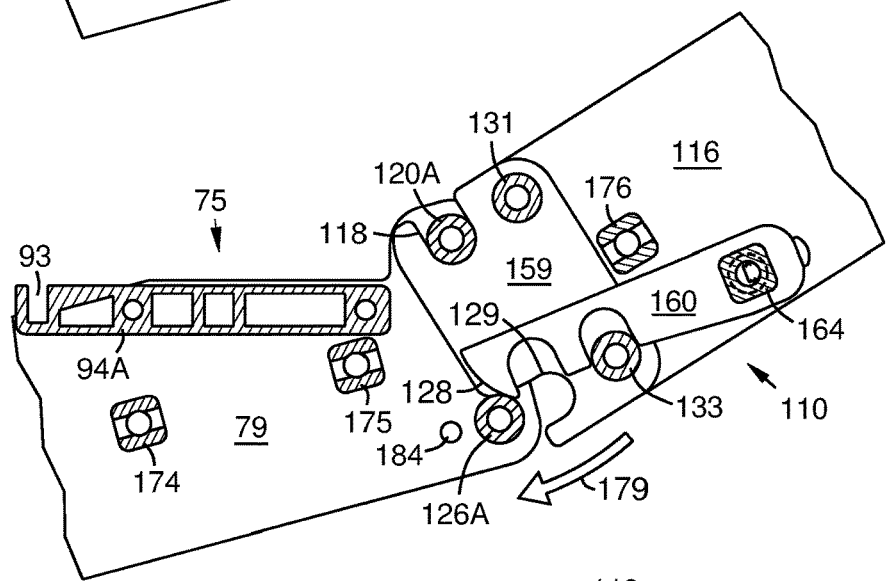
FIG. 33 is view as in FIG. 32 showing a next step of coupling.
Figure 34:
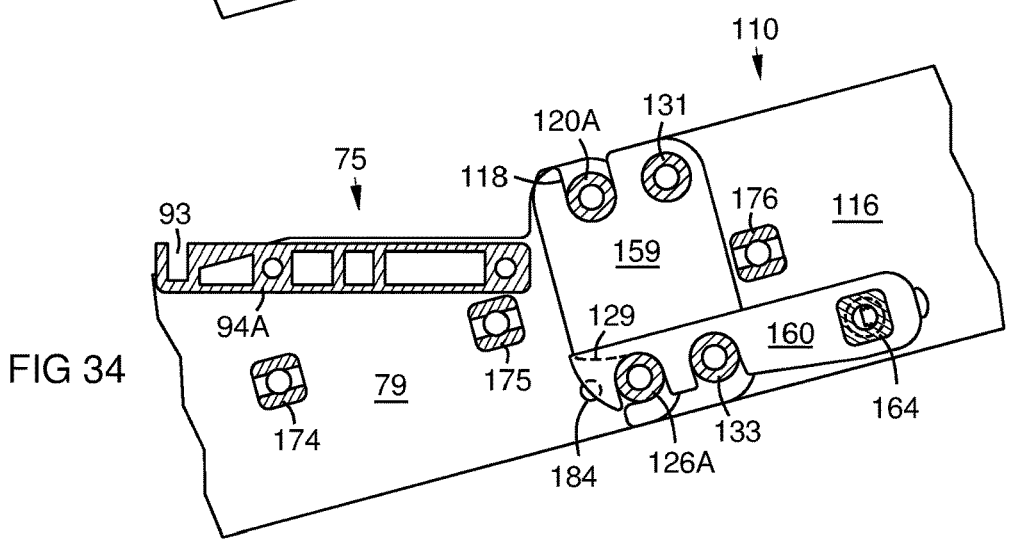
FIG. 34 is a view as in FIG. 32 showing a final step of coupling.

FIGS. 32-34 are views taken on line 28-28 of FIG. 27 with the trigger bars removed for clarity of the hook 160. FIG. 32 shows the add-on tray assembly 110 approaching the main tray assembly 75 in a direction 169 that causes the upper coupling slot 118 of the add-on tray assembly to slip over the upper coupling bar 120A of the main tray assembly.

FIG. 33 shows the upper coupling bar 120A fully inserted in the upper coupling slot 118. The add-on tray assembly 110 is being rotated 179 about the upper coupling bar to slip the lower coupling slot 129 over the lower coupling bar 126A. The coupling hook 160 may have a surface 128 that contacts the lower coupling bar with a geometry causing the coupling hook to climb over the lower coupling bar 126A automatically against spring force during this rotation 179.

FIG. 34 shows the lower coupling bar 126A fully inserted in the lower coupling slot 128, and the coupling hook closed over the lower coupling bar 126A. The add-on tray 110 assembly is now positively connected to the main tray assembly 75 by interconnecting the lower coupling bar 126A on the main tray assembly 75 to a lower structural crossbar 133 on the add-on tray assembly, preventing separation.

Figure 35:
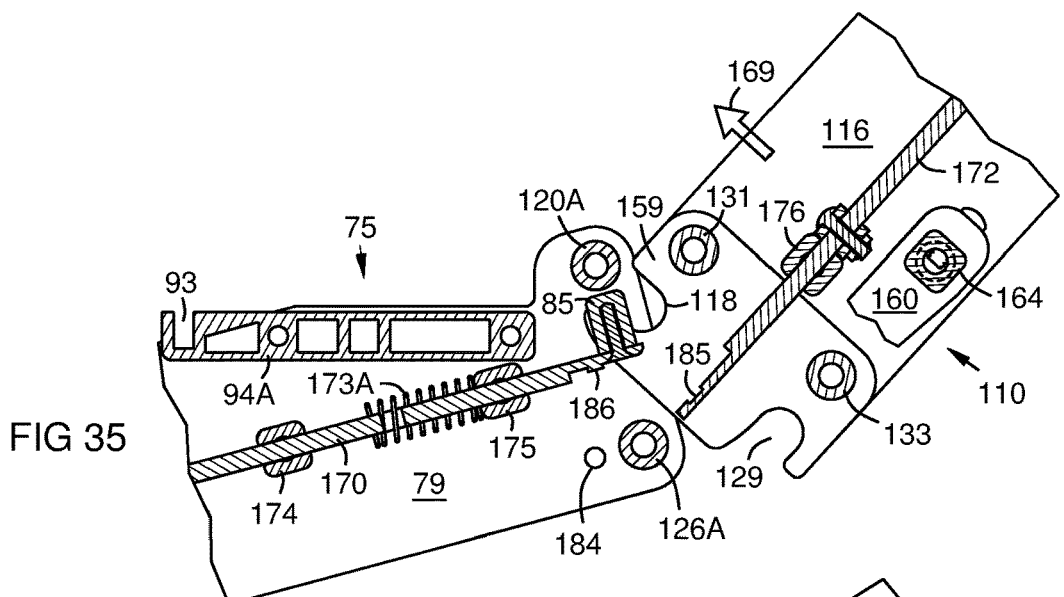
FIG. 35 is a sectional view taken on line 28-28 of FIG. 27 with the coupling hook cut away for clarity, showing an add-on tray assembly approaching a main tray assembly for coupling.
Figure 36:
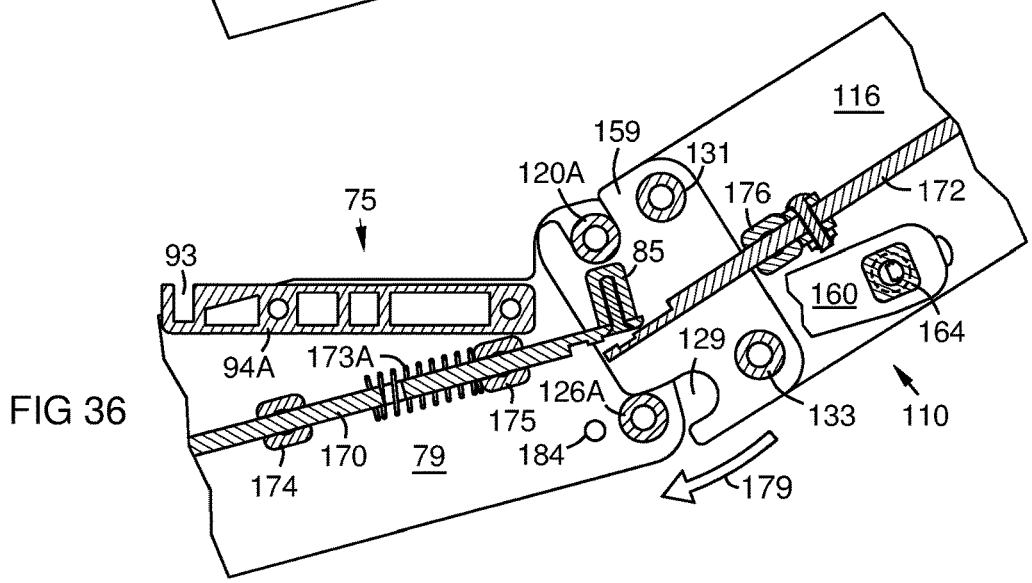
FIG. 36 is view as in FIG. 35 showing a next step of coupling.
Figure 37:
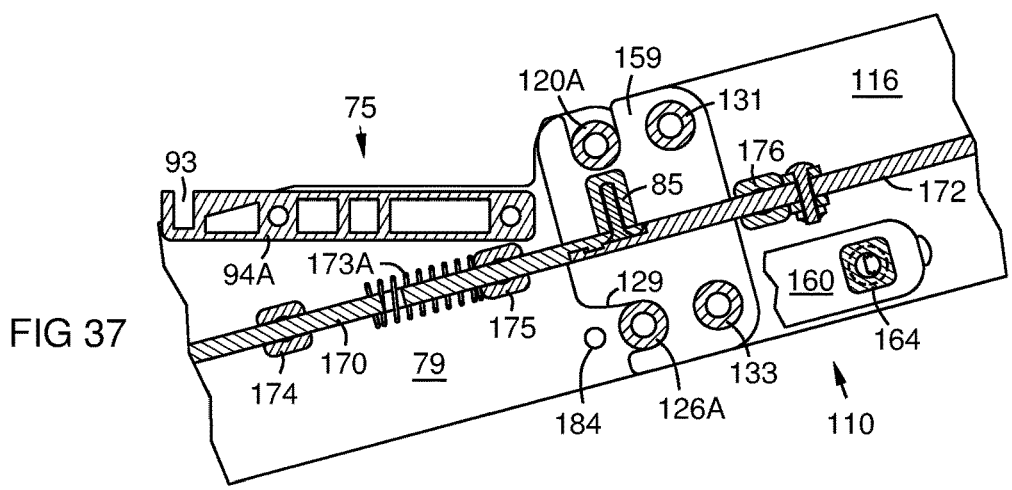
FIG. 37 is a view as in FIG. 35 showing a final step of coupling.

FIGS. 35-37 are views taken on line 28-28 of FIG. 27 showing the add-on tray assembly 110 approaching and joining the main tray assembly 75. The coupling hook 160 is partly removed to more clearly show automatic connection of the add-on trigger bar 172 to the main trigger bar 170. In FIG. 35, the add-on tray assembly is moving in a direction 169 that causes the upper coupling slot 118 of the add-on tray assembly to slip over the upper coupling bar 120A of the main tray assembly.

The upper front end of the add-on trigger bar 172 has a coupling surface 185 that automatically mates with a corresponding coupling surface 186 on the lower back end of the main trigger bar 170 during coupling of the add-on tray assembly to the main tray assembly. For example, a transverse ridge may be provided on the upper front surface of the add-on trigger bar that mates with a transverse groove on the lower back end of the main trigger bar and/or vice versa.

FIG. 36 shows the upper coupling bar 120A fully inserted in the upper coupling slot 118, and the add-on tray 110 is being rotated 179 about the upper coupling bar to slip the lower coupling slot 129 of the add-on tray assembly over the lower coupling bar 126A of the main tray assembly. The upper front end of the add-on trigger bar 172 slides under the lower back end of the main trigger bar 170 on an arcuate path, and snaps into the mating configuration of FIG. 37.

FIG. 37 shows the lower coupling bar 126A fully inserted in the lower coupling slot 128. The front end of the add-on trigger bar 172 is now coupled to the back end of the main trigger bar 170, so that pulling backward on the trigger 134 (FIG. 31) of the add-on trigger bar operates the pivot lock bar 178 via the main trigger bar 170.

Figure 38:
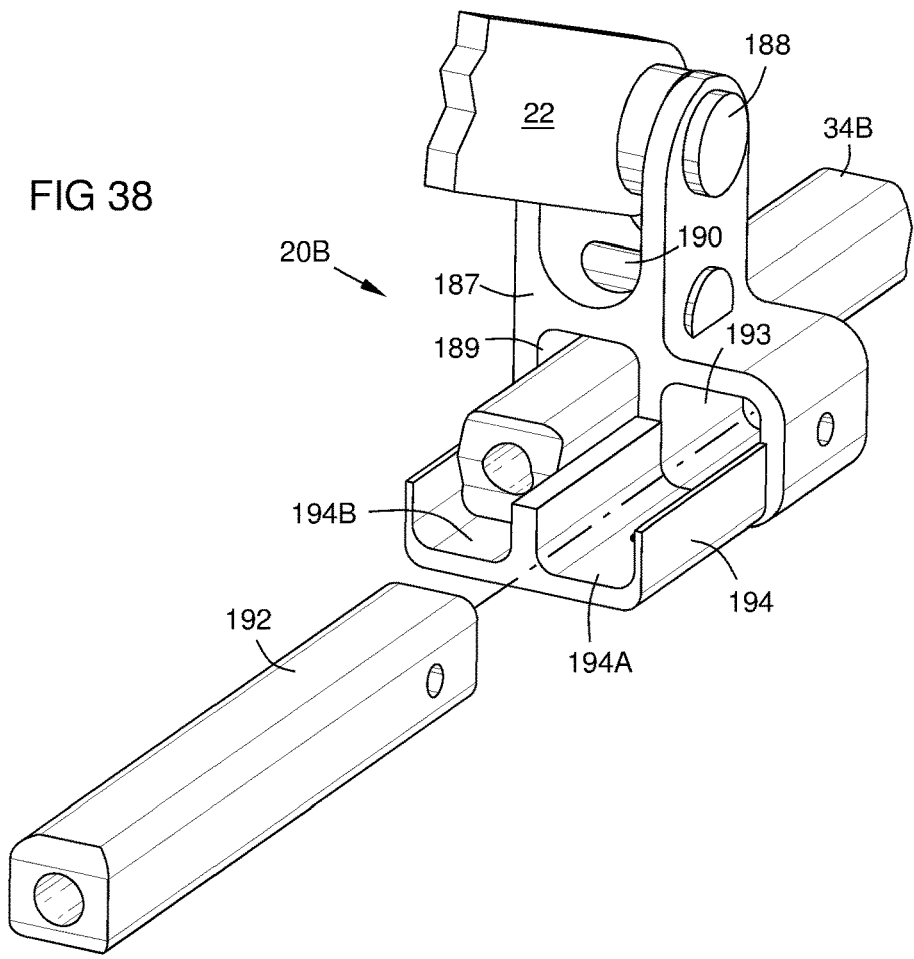
FIG. 38 is a perspective view of a ratchet mechanism in the released position on a portion of a toothless ratchet bar, with a ratchet lever exploded for clarity.

FIG. 38 is a perspective view of a ratchet mechanism 20B for a toothless ratchet bar 34B, a cutaway portion of which is shown. A release lever 192 is shown exploded. This ratchet mechanism has the same location and a similar arrangement to the ratchet mechanism 20 of FIGS. 8 and 9. The pawl body 187 has a pivot connection 188 to a stay 22 of a retention arm 4 (FIG. 8) to control the pivot position of the retention arm. The ratchet bar 34B passes through a first through-hole 189 in the pawl body where it is pinched between cylindrical fingers 190, 191 to lock the ratchet position as later shown. Teeth can be provided on the ratchet bar, but are not needed if the dimensions of the ratchet mechanism are optimum. The inventor has found that this ratchet embodiment made with aluminum alloy 6005 does not slip, even when the toothless ratchet bar 34B is greased. The release lever 192 may be attached to the pawl body 187 for example by insertion into a second through-hole 193 in the pawl body 187.

A pawl over-rotation stop 194 is attached to the bottom side of the lever. It stops upward rotation of the lever by contacting the bottom of the ratchet bar 34B as later shown. It may be formed as a wing, for example as an extruded w-shaped wing as shown, and may be made of plastic to provide smooth sliding along the ratchet bar in the release position shown. The wing may be formed as two parallel connected U-channels as shown, one U-channel 194A is attached to the lever 192, and the other U-channel 194B contacts the bottom and both lateral sides of the ratchet bar 34B and slides along the ratchet bar 34B when the ratchet is in the released position. This configuration keeps the ratchet mechanism 20B in alignment with the ratchet bar 34B during sliding, and holds the ratchet bar centered between the fingers 190, 191 during sliding, for smooth operation.

Figure 39:
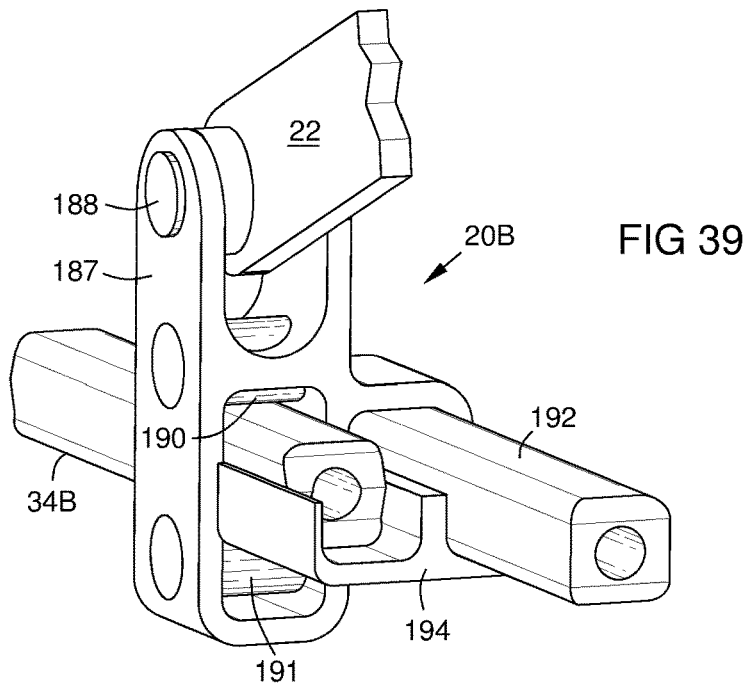
FIG. 39 is a perspective view of the ratchet mechanism of FIG. 38 as seen from the side of the bike carrying tray.

FIG. 39 is a perspective view of the ratchet mechanism 20B as seen from the tray side with the lever 192 assembled into the pawl body 187.

FIG. 40 is a sectional view taken on a vertical plane through the ratchet bar 34B. The retention arm stay 22 is tensioned 195 by the cross-member 25 (FIG. 2) of the retention arm 22 being jammed against a bike tire. The pivot connection 188 is offset from the center of rotation C of the pawl body 187 between the fingers 190, 191, causing the pawl body 187 to rotate about the center C or about the lower finger 191 by an angle A relative to a line P perpendicular to the ratchet bar 34A, causing the fingers to pinch the ratchet bar 34B between them. A spring S urges the pawl body 187 relative to the stay 22 toward the angle A that pinches the pawl bar.

FIG. 41 shows the ratchet mechanism 20B in the released position, which is also shown in FIG. 39. The release lever 192 (FIG. 39) is pulled up manually against the force of the spring S until the pawl over-rotation stop 194 stops against the ratchet bar 34B. This positions the fingers 190, 191 along a line perpendicular to the ratchet bar for maximum clearance with the ratchet bar to release the retention arms 22 from the bike wheel. The stay 22 has a pivot connection 188 to the pawl. The distance D1 from the axis of this pivot connection to the center point C between respective surfaces the two fingers 190, 191 may be 2.2 to 2.8 times greater than a separation distance D2 (FIG. 42) between the surfaces of the two fingers. This ratchet mechanism provides infinite adjustment and minimal backlash when using a toothless ratchet bar.

FIG. 42 clarifies dimensions among elements 188, 190, and 191 of the ratchet. The separation distance D2 between the surfaces of the two fingers 190, 191, may be selected to allow 5 to 15 degrees and especially 7 to 13 degrees of rotation angle A (FIG. 40) until the fingers bind on the ratchet bar 34B. For example, the ratchet bar may be 0.625 inches thick, the fingers 190, 191 may be cylindrical pins 0.5 inches in diameter and 1.14 apart center-to-center, providing 0.64 separation distance D2 between their surfaces, and distance D1 may be 1.60 inches. This configuration provides high friction for retention. The pawl body 187 may be fabricated by extrusion with post extrusion machining.

FIG. 43 is a sectional view taken on line 43-43 of FIG. 41 with the addition of a bike wheel tray 61A. A second ratchet mechanism 21 B may be provided on the opposite side of the tray as shown. Alternately, the opposite side arm 4B (FIG. 9) of the retention arm may lack a stay as shown in FIG. 9. In a ratchet embodiment 21 B shown on the right side, the fingers 190A and 191A may have enlarged heads 196 that stop against the outside surface of the pawl body 187. These fingers are inserted from the outside via channels 197 large enough for the heads 196. When the pawl lever 192 is assembled into the second through-hole 193 in the pawl body, it contacts and blocks the heads 197, locking the fingers in the pawl body.

Figure 44:
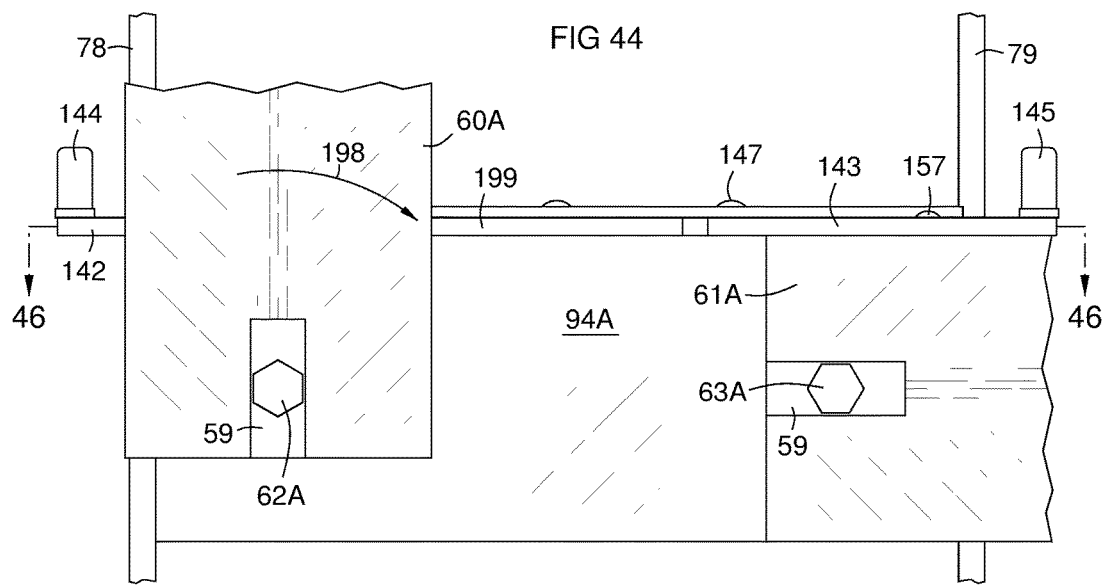
FIG. 44 is a top view of a tray crossbar with bike wheel trays in two positions.

FIG. 44 is a top view of a bike wheel tray crossbar 94A mounted between side plates 78, 79 of a bike wheel tray assembly. A first bike wheel tray 60A is shown in a folded position for compact storage and shipping. It has been rotated inward 198 about its pivot bolt 62A until it stops against a tray rotation stop 199, which stops it in the compact position. First and second tray position lock levers 142, 143 lock the trays in the laterally extending operational position, which is shown by tray 61A. Each tray lock lever pivots about a pin or machine screw 146 (FIG. 45), 147, and may have a forward-extending knob 144, 145 for pushing the lever down to allow rotation 198 of the tray. A spring 156 urges each tray lock lever upward beside a tray as shown in FIG. 46, locking the tray in the laterally extending operational position.

Figure 45:
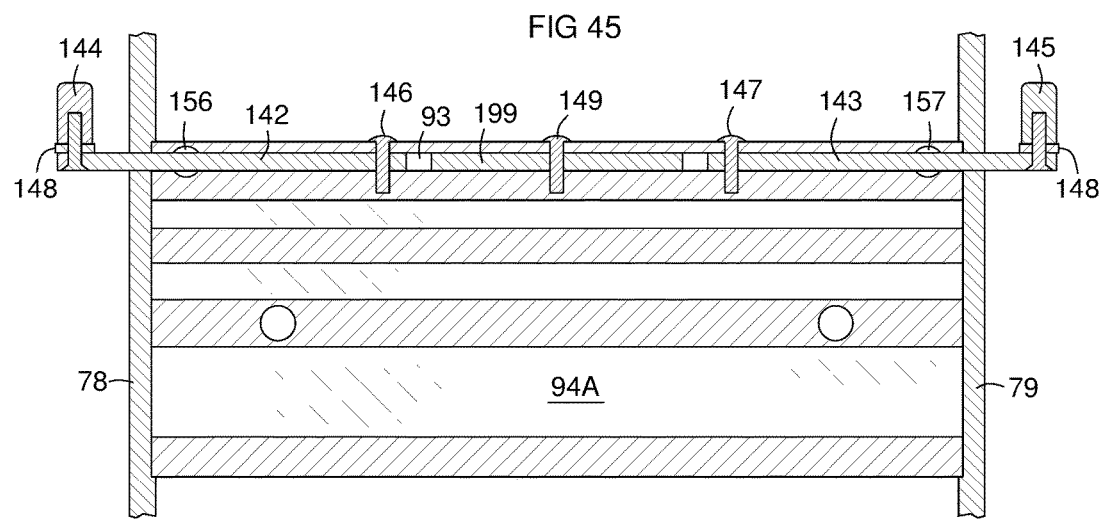
FIG. 45 is a top sectional view of the tray crossbar of FIG. 44.

FIG. 45 is a top sectional view of the bike wheel tray crossbar embodiment of FIG. 44. The tray position lock levers 146, 147 and the tray rotation stop 199 may be mounted in a slot 93 in the tray crossbar 94A. The tray rotation stop 199 may be mounted by a fixed pin or screw 149. A plastic washer 148 with a slightly larger diameter than the width of each lever 142, 143 may be provided under each knob 144, 145 to contact the bottom of each tray during folding of the tray to minimize friction of the lever against the bottom of the tray during folding and to prevent the wear of metal on metal during folding.

FIG. 46 is a sectional view taken on line 46-46 of FIG. 44. A first bike wheel tray 60A is in the folded compact position against tray rotation stop 199. Tray position lock lever 143 is held down by the tray 60A against the force of spring 156. The second tray 61A is in the operational position. Position lock lever 142 is held upward beside the tray by spring 157, automatically blocking the tray in the operational position. The inside lower corner 155 of each lever 142, 143 stops the upward rotation of lever by contacting the bottom of the slot 93 in which the lever is retained. The lever pivot point is a pin or screw 146. Diametric clearance of at least 0.05 inches between the screw 146 and a hole 158 in the lever for the screw 146 may be provided. This allows the lever to be depressed against the bottom of the slot 93 for tray folding while also allowing it to pivot upward without its lower inner corner 155 binding on the bottom of the slot until a predetermined stopping point is reached that holds the lever 142 in a tray blocking position.

While various embodiments of the present invention have been shown and described herein, such embodiments are provided by way of example only. Changes and substitutions may be made without departing from the invention herein. Accordingly, the invention should be limited only by the intended meaning and scope of the claims.

The invention claimed is:

1. A bike carrier for a trailer hitch receiver on a motor vehicle, the bike carrier comprising:
    a drawbar for the trailer hitch receiver;
    a first bike carrying tray assembly attached to the drawbar;
    a horizontal upper coupling bar and a horizontal lower coupling bar on a back end of the first bike carrying tray assembly;
    a second bike carrying tray assembly comprising a top front end with left and right upward facing coupling slots that slip onto the upper coupling bar of the first bike carrying tray assembly;
    a bottom front end of the second bike carrying tray assembly comprising left and right forward facing coupling slots that slip onto the lower coupling bar of the first bike carrying tray assembly when the upper coupling bar is fully inserted within the upward facing coupling slots and the second bike carrying tray assembly is then rotated downward about the upper coupling bar; and
    a mechanism that retains the lower coupling bar in the forward facing coupling slots when the upper and lower coupling bars are fully inserted into the respective upward facing and forward facing coupling slots.

2. The bike carrier of claim 1, wherein the mechanism that retains the lower coupling bar in the forward facing coupling slots comprises a coupling hook on the second bike carry tray assembly that engages the lower coupling bar when the lower coupling bar is within the forward facing coupling slots, preventing separation of the lower coupling bar from the forward facing coupling slots.

3. The bike carrier of claim 2, wherein the coupling hook interconnects the lower coupling bar with a structural crossbar of the second bike carrying tray assembly.

4. The bike carrier of claim 2, wherein the coupling hook is pivotally mounted on the second bike carrying tray assembly, and it hooks over the lower coupling bar when the lower coupling bar is within the forward facing coupling slots.

5. The bike carrier of claim 4, wherein the coupling hook is mounted to a crossbar of the second bike carrying tray assembly for pivotal movement.

6. The bike carrier of claim 4, wherein the coupling hook comprises a first hook slot that receives the lower coupling bar, and a second hook slot that receives a structural crossbar of the second bike carrying tray assembly.

7. The bike carrier of claim 4, wherein the coupling hook comprises a surface with a geometry that causes the coupling hook to climb over the lower coupling bar when said surface is pressed against the lower coupling bar during the rotation of the second bike carrying tray assembly about the upper coupling bar, wherein said climb overrides a spring force on the coupling hook until it falls over the lower coupling bar under the spring force, retaining the lower coupling bar in the forward facing slots.

8. The bike carrier of claim 1, further comprising:
a pivot plate on the drawbar;
a plurality of pivot position lock slots in the pivot plate;
the first bike carrying tray assembly pivotally mounted on the pivot plate to pivot about an axis;
a pivot lock bar on the first bike carrying tray assembly that slides into a selected one of the pivot position lock slots under force of a spring to lock a selected pivot position of the first bike carrying tray assembly relative to the pivot plate; and
a first trigger bar in the first bike carrying tray assembly, wherein the first trigger bar is connected to the pivot lock bar and extends backward therefrom to the back end of the first bike carrying tray assembly;
wherein pulling the first trigger bar backward pulls the pivot lock bar out of the selected pivot position lock slot against the force of the spring, allowing the first bike carrying tray assembly to pivot to another position about the pivot plate.

9. The bike carrier of claim 8, further comprising a floating connection between the first trigger bar and the pivot lock bar that transmits linear motion from the first trigger bar to the pivot lock bar while providing at least 0.1 degree of angular play between the pivot lock bar and the first trigger bar in a plane normal to the pivot axis, enabling the pivot lock bar to slide in and out of each of the pivot position lock slots without binding.

10. The bike carrier of claim 8, further comprising:
a second trigger bar slidably mounted in the second bike carrying tray assembly and spanning from the front end to a back end thereof;
wherein a back end of the first trigger bar and a front end of the second trigger bar are shaped to interconnect automatically during the rotation of the second bike carrying tray assembly about the upper coupling bar;
wherein pulling the second trigger bar backward pulls the pivot lock bar out of the selected pivot position lock slot via the first trigger bar.

11. The bike carrier of claim 10, wherein the front end of the second trigger bar comprises an upper surface with a transverse ridge or groove that mates with a respective transverse groove or ridge in the back end of the first trigger bar when the second bike carrying tray assembly is coupled to the first bike carrying tray assembly.

12. The bike carrier of claim 1, further comprising:
an elongated tray on the first bike carrying tray assembly that holds a wheel of a bike in an upright position from below;
a retention arm pivotally connected to the tray; and
a cross member on the retention arm that presses inward against a tire of the bike wheel at a position above an axle of the bike wheel with a force maintained by tension in a stay pivotally connected between the retention arm and a ratchet mechanism on the tray;
the ratchet mechanism comprising a pawl slidably mounted on a ratchet bar on the tray, a finger on the pawl that jams against the ratchet bar to stop the ratchet from sliding, a pawl lever that releases the finger from the ratchet bar, and an over-rotation stop on the pawl that prevents the pawl from rotating in a release direction to a position that drags the finger against the ratchet bar.

13. The bike carrier of claim 12, wherein the over-rotation stop contacts the ratchet bar and stops rotation of the pawl in the release direction at a release position of the pawl.

14. The bike carrier of claim 12, wherein the pawl comprises first and second fingers on opposite sides of the ratchet bar that pinch the ratchet bar between them when a the pawl is rotated 5 to 15 degrees from a position in which the fingers are directly opposed to each other across the ratchet bar on a common perpendicular to the ratchet bar, and the over-rotation stop comprises a wing attached to the lever of the pawl, wherein a U-channel portion of the wing contacts and slides along the bottom and lateral sides of the ratchet bar in a release position of the pawl at which the ratchet bar is centered between the fingers.

15. The bike carrier of claim 14, further comprising a pivot connection of the stay to the pawl, wherein a distance between an axis of a pivot connection of the stay to the pawl and a center point between respective surfaces the two fingers is 2.2 to 2.8 times greater than a separation distance between the surfaces of the two fingers.

16. The bike carrier of claim 14, wherein said opposite sides of the ratchet bar are toothless, providing infinite adjustability within a sliding range of the pawl on the ratchet bar.

17. A bike carrier for a trailer hitch receiver on a motor vehicle, the bike carrier comprising:
a drawbar for the trailer hitch receiver;
a first bike carrying tray assembly attached to the drawbar;
first and second coupling bars on a back end of the first bike carrying tray assembly;
a second bike carrying tray assembly comprising a front end with a first coupling slot that slides over the first coupling bar, and a second coupling slot oriented circumferentially relative to a circle centered in the first coupling slot, wherein the second coupling slot slides over the second coupling bar when the first coupling bar is fully inserted within the first coupling slot and the second bike carrying tray assembly is then rotated about the first coupling bar toward the second coupling bar; and
a mechanism that retains the second coupling bar in the second coupling slot.

18. The bike carrier of claim 17, wherein the first bike carrying tray assembly further comprises:
first and second bike wheel carrying trays for holding respective first and second wheels of a bike;
each bike wheel carrying tray pivotally mounted to the first bike carrying tray assembly for pivoting of said trays between a co-aligned laterally opposed operational position and a forward position for compact shipping and storage; and
a wheel tray lock bar slidably mounted in the bike carrying tray assembly and spring-loaded upward to a stopping point immediately beside the bike wheel carrying trays, automatically and releasably locking said trays in the operational position.

19. The bike carrier of claim 17, further comprising:
the first bike carrying tray assembly attached by a pivot mechanism to the drawbar for pivoting the first bike carrying tray assembly about a horizontal pivot axis to a selectable pivot position that is released via a first trigger bar slidably mounted in the first bike carrying tray assembly, the first trigger bar comprising a first manual grip at the back end of the first bike carrying tray assembly; and a second trigger bar slidably mounted in the second bike carrying tray assembly, the second trigger bar comprising a second manual grip at a back end of the second bike carrying tray assembly;

the second trigger bar further comprising a front end that automatically connects to a back end of the first trigger bar when the second bike carrying tray assembly is coupled to the first bike carrying tray assembly;

wherein the selectable pivot position is releasable from the back end of the second bike carrying tray assembly via the second manual grip acting through the first and second trigger bars when the second bike carrying tray assembly is coupled to the first bike carrying tray assembly.

20. The bike carrier of claim 19, further comprising a spring mounted in the first trigger bar in a generally H-shaped cut through the trigger bar that forms a central mandrel for the spring with an entrance gap in the mandrel for installation of the spring; wherein the spring pushes against a crossbar of the first tray assembly through which the trigger bar passes, urging the first trigger bar forward.

21. The bike carrier of claim 17, wherein the first bike carrying tray assembly further comprises:
first and second bike wheel carrying trays for holding respective first and second wheels of a bike; and
each bike wheel carrying tray pivotally mounted to the first bike carrying tray assembly for pivoting of said trays between a co-aligned laterally opposed operational position and a forward position for compact shipping and storage;

wherein each bike wheel carrying tray is associated with a respective tray position lock lever pivotally mounted to the first bike carrying tray assembly and urged upward by a spring to a position adjacent a side of the tray in the operational position of the tray, preventing rotation of the tray to the forward position;

wherein pushing down the tray position lock lever allows the tray to pivot to the forward position.

22. The bike carrier of claim 21, further comprising:
a tray crossbar mounted transversely between first and second side plates of the first bike carrying tray assembly;

the first and second bike wheel carrying trays pivotally mounted to the tray crossbar;

each respective tray position lock lever mounted in a slot in the tray crossbar by a pivot pin or screw passing through the lever, wherein a first end of each tray position lock lever pivots upward under force of the spring until a lower corner of an opposite end of the tray position lock lever stops against a bottom surface of the slot in the tray crossbar.

23. The bike carrier of claim 22 wherein the pivot pin or screw passes through a hole in the tray position lock lever with diametric clearance of at least 0.05 inches, wherein the tray position lock lever can be depressed against the bottom surface of the slot in the tray crossbar to allow tray folding, and can pivot upward therefrom without said lower corner thereof binding against the bottom surface of the slot until said lower corner stops against the bottom surface of the slot at a predetermined tray blocking position beside the tray.

* * * * *